(12) United States Patent
Homer et al.

(10) Patent No.: US 7,590,130 B2
(45) Date of Patent: Sep. 15, 2009

(54) COMMUNICATIONS SYSTEM WITH FIRST AND SECOND SCAN TABLES

(75) Inventors: Russell Homer, Los Gatos, CA (US); Khai Hoan Duong, Milpitas, CA (US)

(73) Assignee: Exar Corporation, Fremont, CA (US)

( * ) Notice: Subject to any disclaimer, the term of this patent is extended or adjusted under 35 U.S.C. 154(b) by 497 days.

(21) Appl. No.: 11/020,874

(22) Filed: Dec. 22, 2004

(65) Prior Publication Data

US 2006/0133406 A1 Jun. 22, 2006

(51) Int. Cl.
*H04L 12/40* (2006.01)
(52) U.S. Cl. .................................. 370/404; 370/438
(58) Field of Classification Search ............ 370/395.3, 370/404, 438, 216, 412, 535, 223, 449, 395.1, 370/468, 222, 254; 359/127, 110; 398/59, 398/45, 5; 709/241; 361/788
See application file for complete search history.

(56) References Cited

U.S. PATENT DOCUMENTS

| | | | |
|---|---|---|---|
| 5,311,509 A * | 5/1994 | Heddes et al. .............. 370/397 |
| 5,375,236 A | 12/1994 | Taneda |
| 5,537,393 A | 7/1996 | Shioda et al. |
| 5,719,858 A | 2/1998 | Moore |
| 5,815,490 A * | 9/1998 | Lu .............................. 370/223 |
| 6,021,112 A * | 2/2000 | Sugawara .................... 370/222 |
| 6,269,088 B1 * | 7/2001 | Masui et al. ................ 370/335 |
| 6,473,397 B1 * | 10/2002 | Au .............................. 370/223 |
| 6,504,963 B1 * | 1/2003 | Fang et al. ................... 385/16 |
| 6,519,261 B1 | 2/2003 | Brueckheimer et al. |
| 6,614,754 B1 | 9/2003 | Usuba et al. |
| 6,618,383 B1 * | 9/2003 | Tomlins ................... 370/395.5 |
| 6,625,172 B2 * | 9/2003 | Odenwalder et al. ........ 370/474 |
| 6,674,750 B1 | 1/2004 | Castellano |
| 6,678,474 B1 | 1/2004 | Masuda et al. |
| 6,747,977 B1 | 6/2004 | Smith et al. |
| 6,791,991 B1 * | 9/2004 | Mobin et al. ................ 370/412 |

(Continued)

FOREIGN PATENT DOCUMENTS

WO    WO2006068913    *   6/2006

(Continued)

OTHER PUBLICATIONS

Parallel header processing in an all-optical packet switch; Ingram, R.; Leuschner, F.W.; Geldenhuys, R.; AFRICON, 2004. 7th AFRICON Conference in Africa vol. 2, 2004 pp. 991-994 vol. 2.*

(Continued)

*Primary Examiner*—Ayaz Sheikh
*Assistant Examiner*—Salman Ahmed
(74) *Attorney, Agent, or Firm*—Townsend and Townsend and Crew LLP

(57) ABSTRACT

A communications system comprising a first stage including a first scan table and a second stage including a second scan table. The first stage is configured to select a first channel identification from the first scan table and provide data from a channel identified by the first channel identification. The second stage is configured to receive the data and select a second channel identification from the second scan table to provide the received data at essentially a data rate of the channel on a synchronous network.

37 Claims, 10 Drawing Sheets

U.S. PATENT DOCUMENTS

| | | | |
|---|---|---|---|
| 6,798,744 B1 | 9/2004 | Loewen et al. | |
| 6,836,771 B2 | 12/2004 | Brown | |
| 6,925,549 B2* | 8/2005 | Cook et al. | 712/25 |
| 7,283,465 B2 | 10/2007 | Zelig et al. | |
| 7,355,985 B2* | 4/2008 | Virdee | 370/254 |
| 2001/0019540 A1 | 9/2001 | Uematsu et al. | |
| 2002/0024698 A1* | 2/2002 | Jiang et al. | 359/127 |
| 2002/0024931 A1 | 2/2002 | Chikazawa et al. | |
| 2002/0027928 A1* | 3/2002 | Fang | 370/468 |
| 2002/0041592 A1 | 4/2002 | Van Der Zee et al. | |
| 2002/0083298 A1* | 6/2002 | Cook et al. | 712/25 |
| 2002/0159410 A1* | 10/2002 | Odenwalder et al. | 370/329 |
| 2002/0163930 A1* | 11/2002 | Kreider et al. | 370/449 |
| 2002/0167898 A1* | 11/2002 | Thang et al. | 370/216 |
| 2002/0176422 A1* | 11/2002 | Shirasaki | 370/395.1 |
| 2003/0021287 A1 | 1/2003 | Lee et al. | |
| 2003/0048747 A1 | 3/2003 | Tazawa et al. | |
| 2003/0169470 A1* | 9/2003 | Alagar et al. | 359/110 |
| 2003/0223749 A1* | 12/2003 | Funk et al. | 398/59 |
| 2003/0227943 A1 | 12/2003 | Hallman et al. | |
| 2004/0047367 A1 | 3/2004 | Mammen | |
| 2004/0057469 A1* | 3/2004 | Nuss et al. | 370/535 |
| 2004/0062278 A1 | 4/2004 | Hadzic et al. | |
| 2004/0170166 A1 | 9/2004 | Cohen | |
| 2004/0170173 A1 | 9/2004 | Pan et al. | |
| 2004/0170184 A1 | 9/2004 | Hashimoto | |
| 2004/0179836 A1* | 9/2004 | Yamaguchi et al. | 398/5 |
| 2004/0190548 A1 | 9/2004 | Harel et al. | |
| 2004/0193729 A1* | 9/2004 | Saraph | 709/241 |
| 2004/0252717 A1 | 12/2004 | Solomon et al. | |
| 2005/0041601 A1 | 2/2005 | Kam et al. | |
| 2005/0141437 A1* | 6/2005 | Burnett et al. | 370/254 |
| 2005/0232311 A1* | 10/2005 | Virdee | 370/907 |
| 2007/0223425 A1* | 9/2007 | Masui et al. | 370/335 |
| 2007/0223514 A1* | 9/2007 | Odenwalder et al. | 370/442 |
| 2008/0075460 A1* | 3/2008 | Islam | 398/45 |
| 2008/0285248 A1* | 11/2008 | Goergen | 361/788 |

FOREIGN PATENT DOCUMENTS

| | | | |
|---|---|---|---|
| WO | WO2006068915 | * | 6/2006 |
| WO | WO2006069058 | * | 6/2006 |

OTHER PUBLICATIONS

Optical Single Side Band SCM Header generation and 20Gb/s Payload combination/separation of multiple Label Swapping channels using Fibre Bragg Grating Arrays. Martinez, A.; Pastor, D.; Capmany, J.; Popov, M.; Banky, T.; Microwave Photonics, 2006. MWP '06. International Topical Meeting on Oct. 3-6, 2006 pp. 1-4.*

Design of optical decoder and optical address translator for high speed optical switching network; Yang-Han Lee; Microwave and Optoelectronics Conference, 1997. 'Linking to the Next Century'. Proceedings., 1997 SBMO/IEEE MTT-S International vol. 2, Aug. 11-14, 1997 pp. 453-456 vol. 2.*

Packet-error rate based power budget for multiple-access WDM networks with subcarrier multiplexed control packets; Das, D.; Dutta, G.; Datta, D.; Photonics Technology Letters, IEEE vol. 12, Issue 3, Mar. 2000 pp. 359-361.*

Final Office Action from U.S. Appl. No. 11/020,994 dated Feb. 6, 2008.

Office Action from U.S. Appl. No. 11/020,994 dated Oct. 6, 2008.

Office Action from U.S. Appl. No. 11/020,994 dated Apr. 1, 2009.

* cited by examiner

COMMUNICATIONS SYSTEM WITH FIRST AND SECOND SCAN TABLES

BACKGROUND

Computer system speeds continue to increase and more computer systems are connected to communicate with other computer systems daily. As the volume of digital data communicated between computer systems increases, there is a need to develop higher bandwidth communication links. Often, these communication links are part of a network, such as a local area network (LAN), metro area network (MAN), or a wide area network (WAN).

A network includes network nodes that provide network related functions. Each network node is a grouping of one or more network elements, such as computer systems, and each network node includes one or more communication links connected to the network. In addition, each network node is administered as a single entity. Network elements in a network node can be at one or more sites and a single site may contain more than one network node. Network elements on a network communicate with other network elements on the network by employing some type of suitable network communication, such as synchronous communication and/or asynchronous communication.

In synchronous communication, transmission system payloads are synchronized to a master clock that is traceable back to a highly stable reference clock. The digital transitions in signals occur at essentially the same rate. Synchronous communication often uses time division multiplexing (TDM) as a mechanism for dividing the bandwidth of a communication link into separate channels or time slots. In TDM, multiple data streams are put into a single signal by separating the signal into many segments, each having a very short duration. Each individual data stream is reassembled at the receiving end based on the timing. A synchronous TDM interface transmits and receives data traffic at a constant bit rate, whether or not data is available for transmission.

One type of synchronous network is a synchronous optical network and synchronous digital hierarchy (SONET/SDH) ring network. SONET and SDH are a set of related standards for synchronous data transmission over fiber optic networks. SONET is the United States standard published by the American National Standards Institute (ANSI) and SDH is the international standard published by the International Telecommunication Union (ITU). A SONET/SDH ring network is one medium of choice for delivering services over a MAN and/or a WAN.

In asynchronous communication, transmission system payloads are not synchronized to a master clock. Instead, each network element operates from its own clock. Data packets or frames are transmitted asynchronously as the packets become available for transmission. In the case where there are no packets available for transmission, the asynchronous interface can remain inactive.

In some networks, network elements on the network communicate with other network elements on the network through synchronous TDM and asynchronous packet interfaces. Data traffic crosses one or more synchronous TDM interfaces and one or more asynchronous packet interfaces as it travels from one network element to another network element on the network. Data packets are transmitted by the asynchronous packet interfaces as they become available and data traffic is transmitted at a constant bit rate by the synchronous TDM interfaces. This can lead to serious problems in maintaining data transmission rates on the synchronous TDM networks. To maintain constant bit rates through the synchronous TDM interfaces, large buffers are employed to avoid overflow and underflow conditions. Implementing large buffers in a system and/or in an integrated circuit chip uses space and adds cost to the system and/or chip. In addition, the feedback status of the buffers becomes a time critical event to avoid overflow and underflow conditions.

For these and other reasons there is a need for the present invention.

SUMMARY

One aspect of the present invention provides a communications system comprising a first stage including a first scan table and a second stage including a second scan table. The first stage is configured to select a first channel identification from the first scan table and provide data from a channel identified by the first channel identification. The second stage is configured to receive the data and select a second channel identification from the second scan table to provide the received data at essentially a data rate of the channel on a synchronous network.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
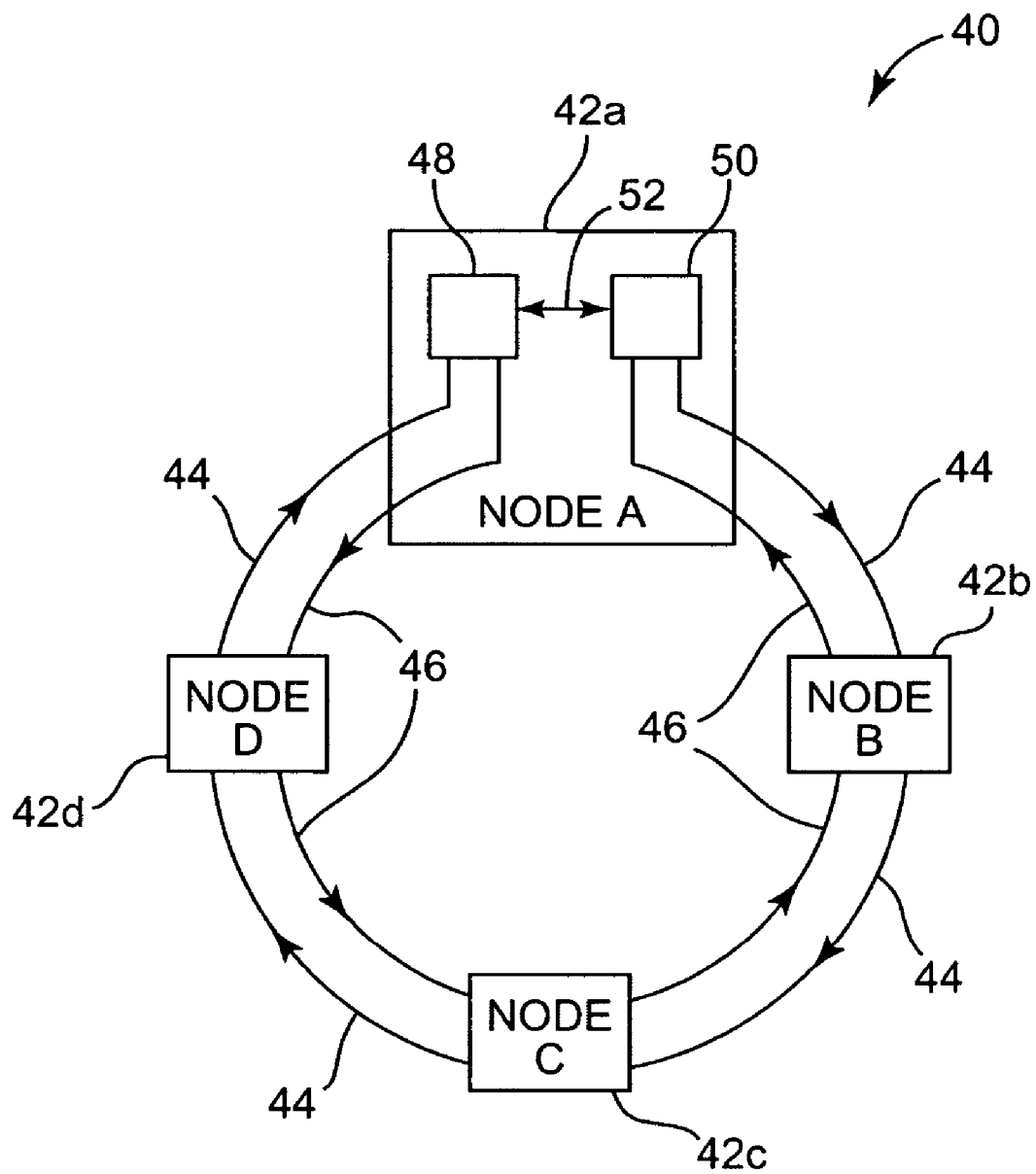
FIG. 1 is a diagram illustrating one embodiment of a resilient packet ring network.

FIG. 1 is a diagram illustrating one embodiment of a resilient packet ring (RPR) network 40. RPR 40 includes network nodes A-D at 42a-42d, respectively, a clockwise communications path 44, and a counter clockwise communications path 46. Each of the nodes A-D at 42a-42d includes one or more network elements and is communicatively coupled to clockwise communications path 44 and to counter clockwise communications path 46. RPR 40 is a synchronous network. In one embodiment, RPR 40 is a synchronous TDM network such as a SONET/SDH network including TDM of data.

Node A at 42a includes a west device 48 and an east device 50. West device 48 is communicatively coupled to clockwise communications path 44 and to counter clockwise communications path 46. Also, east device 50 is communicatively coupled to clockwise communications path 44 and to counter clockwise communications path 46. In addition, west device 48 is communicatively coupled to east device 50 via communications path 52. West device 48 communicates with east device 50 in asynchronous packet communication via communications path 52. Each of the other nodes B-D 42b-42d is similar to node A at 42a. In other embodiments, each of the nodes A-D 42a-42d can be different and include any suitable devices.

West device 48 and east device 50 receive and transmit data synchronously in TDM channels or timeslots via clockwise communications path 44 and counter clockwise communications path 46. West device 48 and east device 50 communicate with each other in asynchronous packet communication via communications path 52. West device 48 and east device 50 are configured to convert between synchronous and asynchronous communication and to maintain a constant data rate or channel bandwidth in each of the TDM channels of RPR 40.

West device 48 transmits and receives data to service one or more network elements. West device 48 receives data synchronously in TDM channels or timeslots via clockwise communications path 44 and west device 48 receives data asynchronously in packets from east device 50 via communications path 52. West device 48 can consume data received via clockwise communications path 44 and/or transmit the data asynchronously in packets to east device 50 via communications path 52. East device 50 can transmit data received via communications path 52 to other nodes, such as nodes B-D at 42b-42d, synchronously in TDM channels or timeslots via clockwise communications path 44. West device 48 can transmit data received in packets from east device 50 via communications path 52 to other nodes, such as nodes B-D at 42b-42d, synchronously in TDM channels or timeslots via counter clockwise communications path 46. In one embodiment, west device 48 can consume data received in packets from east device 50. In one embodiment, west device 48 can transmit data packets received from east device 50 back to east device 50 via communications path 52 and east device 50 can transmit the data from the data packets synchronously in TDM channels or timeslots on clockwise communications path 44.

East device 50 transmits and receives data to service one or more network elements. East device 50 receives data synchronously in TDM channels or timeslots via counter clockwise communications path 46 and east device 50 receives data asynchronously in packets from west device 48 via communications path 52. East device 50 can consume data received via counter clockwise communications path 46 and/or transmit the data asynchronously in packets to west device 48 via communications path 52. West device 48 can transmit data received via communications path 52 to other nodes, such as nodes B-D at 42b-42d, synchronously in TDM channels or timeslots via counter clockwise communications path 46. East device 50 can transmit data received in packets from west device 48 via communications path 52 to other nodes, such as nodes B-D at 42b-42d, synchronously in TDM channels or timeslots via clockwise communications path 44. In one embodiment, east device 50 can consume data received in packets from west device 48. In one embodiment, east device 50 can transmit data packets received from west device 48 back to west device 48 via communications path 52 and west device 48 can transmit the data from the data packets synchronously in TDM channels or timeslots on counter clockwise communications path 46.

In one example operation, west device 48 of node A at 42a receives data from a network element at another one of the nodes B-D at 42b-42d via clockwise communications path 44. West device 48 receives the data synchronously in TDM channels via clockwise communications path 44 and reassembles the original data from each channel of the TDM channels. The reassembled data from a channel is stored in a first-in-first-out memory corresponding to that channel. West device 48 consumes data from a channel if the data is intended for a network element serviced by west device 48. West device 48 transmits the data to other network elements in other nodes, such as nodes B-D at 42b-42d. To transmit the data to other nodes, west device 48 transmits the data in packets asynchronously to east device 50 via communications path 52. East device 50 receives the packets and assembles the data from each channel. The assembled data from a channel is stored in a first-in-first-out memory corresponding to that channel. East device 50 transmits the data synchronously in TDM channels via clockwise communications path 44.

In another example operation, the roles of west device 48 and east device 50 are reversed. East device 50 of node A at 42a receives data from a network element at another one of the nodes B-D at 42b-42d via counter clockwise communications path 46. East device 50 receives the data synchronously in TDM channels via counter clockwise communications path 46 and reassembles the original data from each channel of the TDM channels. The reassembled data from a channel is stored in a first-in-first-out memory corresponding to that channel. East device 50 consumes data from a channel if the data is intended for a network element serviced by the east device 50. East device 50 transmits the data to other network elements in other nodes, such as nodes B-D at 42b-42d. To transmit the data to other nodes, east device 50 transmits the data in packets asynchronously to west device 48 via communications path 52. West device 48 receives the packets and assembles the data from each channel. The assembled data from a channel is stored in a first-in-first-out memory corresponding to that channel. West device 48 transmits the data synchronously in TDM channels via counter clockwise communications path 46.

Figure 2:
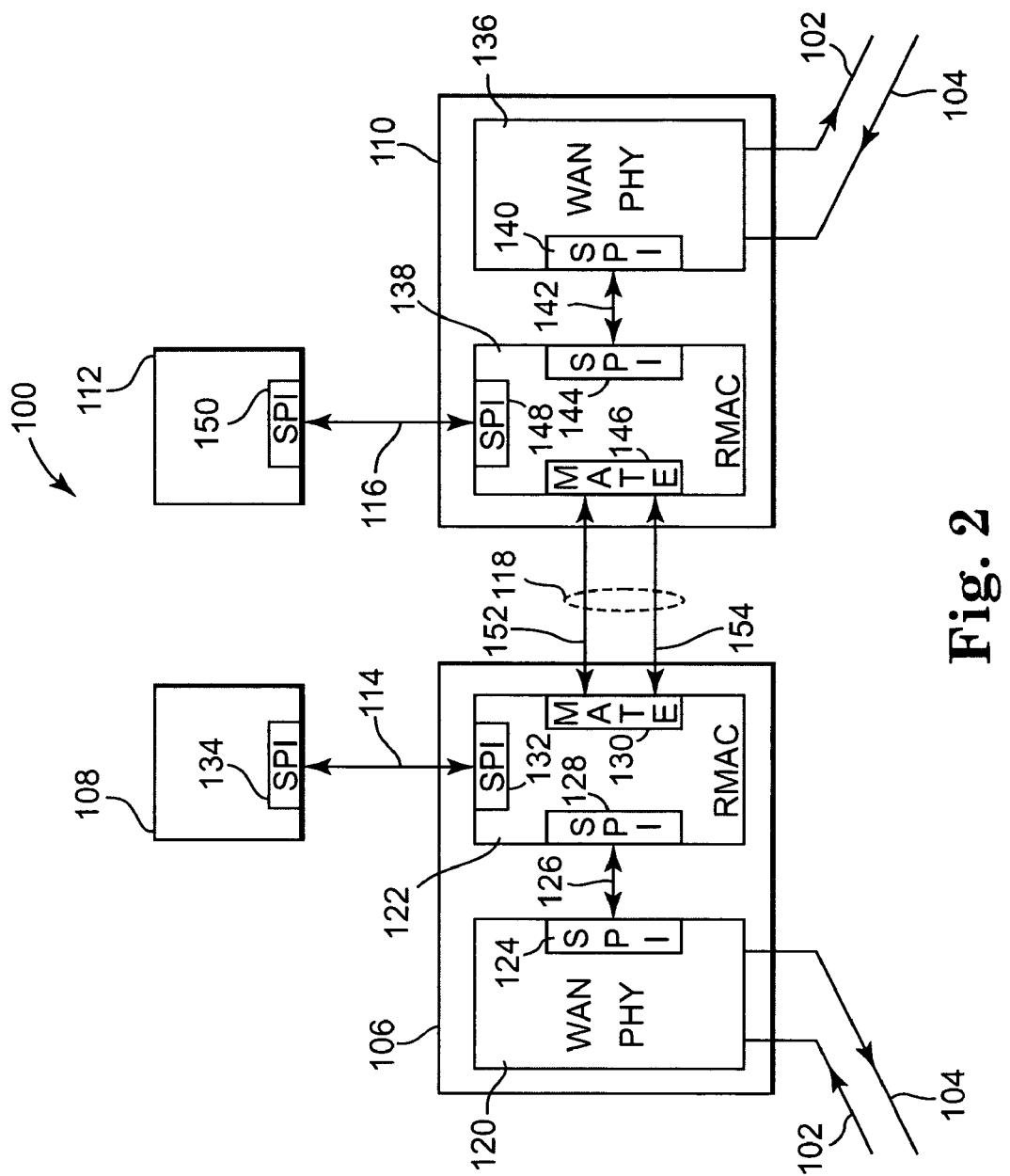
FIG. 2 is a diagram illustrating one embodiment of a network node according to the present invention.

FIG. 2 is a diagram illustrating one embodiment of a network node 100 according to the present invention. Node 100 is similar to node A at 42a (shown in FIG. 1) and part of an RPR network similar to RPR 40 of FIG. 1. Node 100 is communicatively coupled to clockwise communications path 102 and counter clockwise communications path 104. Clockwise communications path 102 is similar to clockwise communications path 44 and counter clockwise communications path 104 is similar to counter clockwise communications path 46. In other embodiments, node 100 can be part of any suitable network.

Node 100 includes a west device 106, west network elements 108, an east device 110 and east network elements 112. West device 106 is similar to west device 48 and east device 110 is similar to east device 50. West device 106 is communicatively coupled to clockwise communications path 102 and to counter clockwise communications path 104. Also, west device 106 is communicatively coupled to west network elements 108 via west network elements communications path 114. East device 110 is communicatively coupled to clockwise communications path 102 and to counter clockwise communications path 104. Also, east device 110 is communicatively coupled to east network elements 112 via east network elements communications path 116. In addition, west device 106 and east device 110 are communicatively coupled via device communications path 118 to communicate bi-directionally with each other. Device communications path 118 is similar to communications path 52 (shown in FIG. 1).

West device 106 includes a west WAN physical layer 120 and a west reconciliation media access control (RMAC) device 122. West WAN physical layer 120 includes a system packet interface (SPI) 124 that is communicatively coupled to west RMAC device 122 via west device SPI communications path 126. Also, west WAN physical layer 120 is communicatively coupled to clockwise communications path 102 and to counter clockwise communications path 104.

West RMAC device 122 includes a west RMAC SPI 128 that is communicatively coupled to SPI 124 via west device SPI communications path 126. Also, west RMAC device 122 includes a west RMAC mate interface 130 and west RMAC network elements SPI 132. West network elements 108 include west network elements SPI 134 communicatively coupled to west RMAC network elements SPI 132 via west network elements communications path 114. West RMAC mate interface 130 is communicatively coupled to east device 110 via device communications path 118.

West WAN physical layer 120 is similar to physical layer 1 of the Open System Interconnection (OSI) model, which is the standard description or reference model that defines a framework for implementing protocols to communicate messages in a communications system. West WAN physical layer 120 conveys a bit stream through the RPR network at the electrical and mechanical level. The bit stream can be conveyed through electrical impulses, radio signals, light, or any suitable transmission technology. West WAN physical layer 120 provides the hardware for sending and receiving data on a carrier, including cables, cards, and other physical aspects. In one embodiment, west WAN physical layer 120 includes a physical layer for interfacing to a SONET/SDH network including clockwise communications path 102 and counter clockwise communications path 104.

West RMAC device 122 includes at least part of the media access control (MAC) sub-layer of the data link layer 2 of the OSI model. West RMAC device 122 controls sharing west WAN physical layer 120 among several west network elements 108, including how the west network elements 108 gain access to data and permission to transmit data.

East device 110 includes an east WAN physical layer 136 and an east RMAC device 138. East WAN physical layer 136 includes an SPI 140 that is communicatively coupled to east RMAC device 138 via east device SPI communications path 142. Also, east WAN physical layer 136 is communicatively coupled to clockwise communications path 102 and to counter clockwise communications path 104.

East RMAC device 138 includes an east RMAC SPI 144 that is communicatively coupled to SPI 140 via east device SPI communications path 142. Also, east RMAC device 138 includes an east RMAC mate interface 146 and east RMAC network elements SPI 148. East network elements 112 include east network elements SPI 150 communicatively coupled to east RMAC network elements SPI 148 via east network elements communications path 116. East RMAC mate interface 146 is communicatively coupled to west RMAC mate interface 130 and west device 106 via device communications path 118.

East WAN physical layer 136 is similar to physical layer 1 of the OSI model. East WAN physical layer 136 conveys a bit stream through the RPR network at the electrical and mechanical level. The bit stream can be conveyed through electrical impulses, radio signals, light, or any suitable transmission technology. East WAN physical layer 136 provides the hardware for sending and receiving data on a carrier, including cables, cards, and other physical aspects. In one embodiment, east WAN physical layer 136 includes a physical layer for interfacing to a SONET/SDH network including clockwise communications path 102 and counter clockwise communications path 104.

East RMAC device 138 includes at least part of the MAC sub-layer of the data link layer 2 of the OSI model. East RMAC device 138 controls sharing east WAN physical layer 136 among several west network elements 108, including how the west network elements 108 gain access to data and permission to transmit data.

SPI 124 and west RMAC SPI 128 communicate in an SPI interface that includes an exchange of data packets between west WAN physical layer 120 and west RMAC device 122. The SPI interface is an asynchronous, parallel data bit interface that includes control signals, a transmit clock, and a receive clock, such as the SPI interface described in Implementation Agreement: OIF-SPI3-01.0, titled "System Packet Interface Level 3 (SPI-3): OC-48 System Interface for Physical and Link Layer Devices", by The Optical Internetworking Forum (OIF) (2001). In other embodiments, any suitable type of interface can be used between west WAN physical layer 120 and west RMAC device 122.

West RMAC network elements SPI 132 and west network elements SPI 134 communicate data packets in an SPI interface similar to the interface of SPI 124 and west RMAC SPI 128. Also, SPI 140 and east RMAC SPI 144 communicate data packets in an SPI interface similar to the interface of SPI 124 and west RMAC SPI 128. In addition, east RMAC network elements SPI 148 and east network elements SPI 150 communicate data packets in an SPI interface similar to the interface of SPI 124 and west RMAC SPI 128. In other embodiments, any suitable type of interface can be used for exchanging data.

West RMAC mate interface 130 is communicatively coupled to east RMAC mate interface 146 via data communications path 152 and status communications path 154. West RMAC mate interface 130 and east RMAC mate interface 146 communicate in asynchronous packet communication and provide full duplex operation. West RMAC mate interface 130 and east RMAC mate interface 146 support data packet transfers between west device 106 and east device 110 via data communications path 152. West RMAC mate interface 130 and east RMAC mate interface 146 support status packet transfers between west device 106 and east device 110 via status communications path 152. In one embodiment, west RMAC mate interface 130 and east RMAC mate interface 146 support data packet transfer rates of 10 Gbps and status packet transfer rates of 1 Gbps. In other embodiments, west RMAC mate interface 130 and east RMAC mate interface 146 support data packet and status packet transfer rates of any suitable bit rate.

In one example operation, west WAN physical layer 120 receives data in channels or timeslots in synchronous TDM communication via clockwise communications path 102. West WAN physical layer 120 assembles the data received for a channel into data packets for the channel. The data packets are transmitted by SPI 124 to west RMAC SPI 128. West RMAC device 122 receives the data packets in asynchronous packet communication via west RMAC SPI 128 from SPI 124. If the data packets are addressed to west network elements 108, west RMAC device 122 transmits the data in the data packets in asynchronous packet communication via west RMAC network elements SPI 132 to west network elements SPI 134 and west network elements 108. West RMAC device 122 also receives data packets for channels in asynchronous packet communication via west RMAC network elements SPI 132 from west network elements SPI 134 and west network elements 108.

West RMAC device 122 segments the received channel data into segments and frames the segments into timeslots in data packets that are transmitted by west RMAC mate interface 130 to east RMAC mate interface 146 via data communications path 152. West RMAC device 122 also frames segment status information of the segments in the data packets into status packets that are transmitted by west RMAC mate interface 130 to east RMAC mate interface 146 via status communications path 154. In one embodiment, west RMAC device 122 transmits data for a channel in the clockwise communications path 102 at approximately the data rate of the channel in clockwise communications path 102.

East RMAC device 138 receives the data packets and the status packets via east RMAC mate interface 146. East RMAC device 138 assembles the data segments in the data packets into the original data for each of the channels. East RMAC device 138 assembles the data for a channel into data packets for the channel and east RMAC SPI 144 transmits the data packets in asynchronous packet communication to SPI 140. East RMAC device 138 transmits data for a channel in clockwise communications path 102 at essentially the data rate of the channel in clockwise communications path 102. East WAN physical layer 136 assembles the data in the data packets into channels in synchronous TDM communication and transmits the data via clockwise communications path 102.

In another example operation, the roles of west device 106 and east device 110 are reversed. East WAN physical layer 136 receives data in channels or timeslots in synchronous TDM communication via counter clockwise communications path 104. East WAN physical layer 136 assembles the data received for a channel into data packets for the channel. The data packets are transmitted by SPI 140 to east RMAC SPI 144. East RMAC device 138 receives the data packets in asynchronous packet communication via east RMAC SPI 144 from SPI 140. If the data packets are addressed to east network elements 112, east RMAC device 138 transmits the data in the data packets in asynchronous packet communication via east RMAC network elements SPI 148 to east network elements SPI 150 and east network elements 112. East RMAC device 138 also receives data packets for channels in asynchronous packet communication via east RMAC network elements SPI 148 from east network elements SPI 150 and east network elements 112.

East RMAC device 138 segments the received channel data into segments and frames the segments into timeslots in data packets that are transmitted by east RMAC mate interface 146 to west RMAC mate interface 130 via data communications path 152. East RMAC device 138 also frames segment status information of the segments in the data packets into status packets that are transmitted by east RMAC mate interface 146 to west RMAC mate interface 130 via status communications path 154. In one embodiment, east RMAC device 138 transmits data for a channel in the counter clockwise communications path 104 at approximately the data rate of the channel in counter clockwise communications path 104.

West RMAC device 122 receives the data packets and the status packets via west RMAC mate interface 130. West RMAC device 122 assembles the data segments in the data packets into the original data for each of the channels. West RMAC device 122 assembles the data for a channel into data packets for the channel and west RMAC SPI 128 transmits the data packets in asynchronous packet communication to SPI 124. West RMAC device 122 transmits data for a channel in counter clockwise communications path 104 at essentially the data rate of the channel in counter clockwise communications path 104. West WAN physical layer 120 assembles the data in the data packets into channels in synchronous TDM communication and transmits the data via counter clockwise communications path 104.

Figure 3:
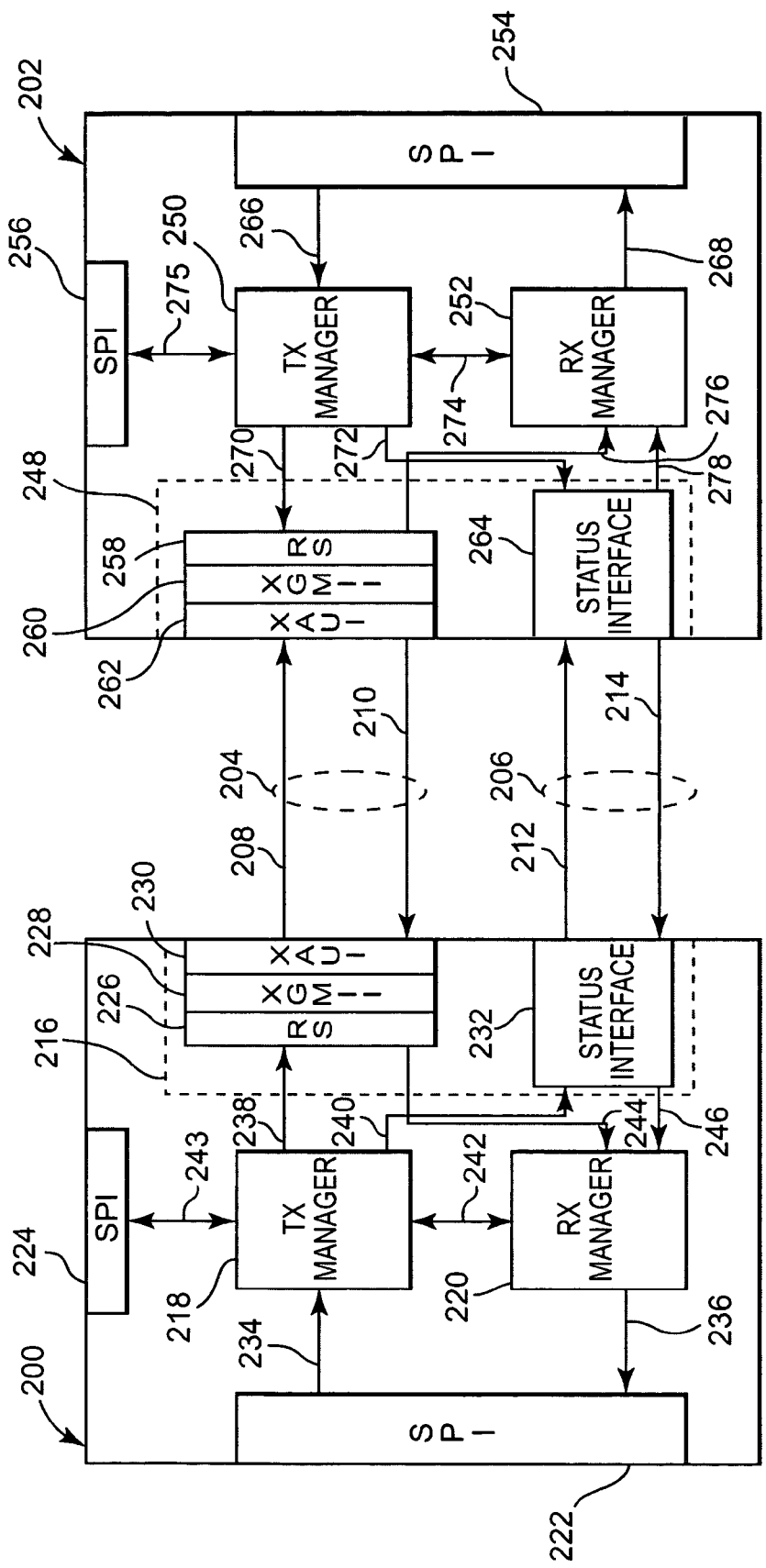
FIG. 3 is a diagram illustrating one embodiment of a west reconciliation media access control (RMAC) device and an east RMAC device in a communications system according to the present invention.

FIG. 3 is a diagram illustrating one embodiment of a west RMAC device 200 and an east RMAC device 202 in a communications system according to the present invention. West RMAC device 200 is similar to west RMAC device 122 (shown in FIG. 2) and east RMAC device 202 is similar to east RMAC device 138 (shown in FIG. 2). West RMAC device 200 communicates with east RMAC device 202 via data communications path 204 and status communications path 206.

Data communications path 204 includes a west-to-east data communications path 208 and an east-to-west data communications path 210. West-to-east data communications path 208 transfers bits at 10 Gbps and east-to-west data communications path 210 transfers bits at 10 Gbps. In other embodiments, west-to-east data communications path 208 and east-to-west data communications path 210 can transfer bits at any suitable frequency.

Status communications path 206 includes a west-to-east status communications path 212 and an east-to-west status communications path 214. West-to-east status communications path 212 transfers bits at 1 Gbps and east-to-west status communications path 214 transfers bits at 1 Gbps. In other embodiments, west-to-east status communications path 212 and east-to-west status communications path 214 can transfer bits at any suitable frequency.

West RMAC device 200 includes west RMAC mate interface, indicated at 216, transmit (TX) manager 218, receive (RX) manager 220, west RMAC SPI 222, and west RMAC network elements SPI 224. West RMAC SPI 222 is similar to west RMAC SPI 128 (shown in FIG. 2) and west RMAC network elements SPI 224 is similar to west RMAC network elements SPI 132 (shown in FIG. 2). West RMAC mate interface 216 is similar to west RMAC mate interface 130 (shown in FIG. 2). West RMAC mate interface 216 includes a reconciliation sub-layer (RS) 226, a 10 Gbps media independent interface (XGMII) 228, a 10 Gbps attachment unit interface (XAUI) 230, and status interface 232.

West RMAC SPI 222 is coupled with and communicates with TX manager 218 via TX communications path 234 and with RX manager 220 via RX communications path 236. TX manager 218 is coupled with and communicates with RS 226 via data TX path 238 and with status interface 232 via status TX path 240. Also, TX manager 218 is coupled with and communicates with RX manager 220 via status path 242. In addition, TX manager 218 is coupled with and communicates with west RMAC network elements SPI 224 via network elements communications path 243. RX manager 220 is coupled with and communicates with RS 226 via data RX path 244 and with status interface 232 via status RX path 246. Status interface 232 is coupled to west-to-east status communications path 212 and east-to-west status communications path 214. RS 226 is coupled with and communicates with XGMII 228 that is coupled with and communicates with XAUI 230 that is coupled to west-to-east data communications path 208 and east-to-west data communications path 210.

East RMAC device 202 includes east RMAC mate interface, indicated at 248, transmit (TX) manager 250, receive (RX) manager 252, east RMAC SPI 254, and east RMAC network elements SPI 256. East RMAC SPI 254 is similar to east RMAC SPI 144 (shown in FIG. 2) and east RMAC network elements SPI 256 is similar to east RMAC network elements SPI 148 (shown in FIG. 2). East RMAC mate interface 248 is similar to east RMAC mate interface 146 (shown in FIG. 2). East RMAC mate interface 248 includes a reconciliation sub-layer (RS) 258, XGMII 260, XAUI 262, and status interface 264.

East RMAC SPI 254 is coupled with and communicates with TX manager 250 via TX communications path 266 and with RX manager 252 via RX communications path 268. TX manager 250 is coupled with and communicates with RS 226 via data TX path 270 and with status interface 264 via status TX path 272. Also, TX manager 250 is coupled with and communicates with RX manager 252 via status path 274. In addition, TX manager 250 is coupled with and communicates with east RMAC network elements SPI 256 via network elements communications path 275. RX manager 252 is coupled with and communicates with RS 258 via data RX path 276 and with status interface 264 via status RX path 278. Status interface 264 is coupled to west-to-east status communications path 212 and east-to-west status communications path 214. RS 258 is coupled with and communicates with XGMII 260 that is coupled with and communicates with XAUI 262 that is coupled to west-to-east data communications path 208 and east-to-west data communications path 210.

West RMAC SPI 222 is an asynchronous packet interface that receives data in data packets from a physical layer, such as west WAN physical layer 120 (shown in FIG. 2). Each of the data packets includes data from a channel in the synchronous TDM network. The data packets are passed to TX manager 218 that assembles the data for each channel into memory locations for that channel. West RMAC SPI 222 also receives data in data packets for channels in the synchronous TDM network from RX manager 220 and transmits the data packets to the physical layer, such as west WAN physical layer 120.

West RMAC network elements SPI 224 is an asynchronous packet interface that receives data in data packets from network elements, such as west network elements 108 (shown in FIG. 2). Each of the data packets includes data for a channel in the synchronous TDM network. The data packets are passed to TX manager 218 that assembles the data for each channel into memory locations for that channel. West RMAC network elements SPI 224 also receives data in data packets for network elements from TX manager 218 and transmits the data packets to the network elements, such as west network elements 108.

TX manager 218 is part of a media access control (MAC) layer in west RMAC device 200. TX manager 218 receives data packets from west RMAC SPI 222 and from west RMAC network elements SPI 224 and assembles the data for each channel into memory locations for that channel. TX manager 218 also regulates the transmission data rate for each channel from west RMAC mate interface 216 to east RMAC mate interface 248. In one embodiment, TX manager 218 transmits data for a channel at approximately the data rate of the channel on the synchronous TDM network.

TX manager 218 divides the data for each channel into data segments and inserts segments from different channels into a segment frame or packet. The segment packet includes timeslots and each timeslot in the segment packet carries a segment from one of the channels. To regulate the transmission data rate for a channel, TX manager 218 inserts and transmits segments from a channel at a data rate, such as the data rate of the channel on the synchronous TDM network.

TX manager 218 compiles segment information about each of the segments in a segment packet. The segment information includes valid data length, segment status, information about the segments destination channel, and the status of the receive buffer of the channel that originated the segment. TX manager 218 inserts the segment information into timeslots in a segment status packet. Each timeslot in the segment status packet carries segment information about one segment in a corresponding segment packet. The sequence of segment information in the segment status packet corresponds to the sequence of segments in the corresponding segment packet.

TX manager 218 transmits the segment packet to RS 226 and the segment status packet to status interface 232. The process of inserting segments into timeslots of a segment packet and inserting segment information into timeslots in a corresponding segment status packet continues for other data. TX manager 218 organizes the segment packets sequentially and presents them to RS 226 for transmission across west-to-east data communications path 208. Also, TX manager 218 organizes segment status packets sequentially and presents them to status interface 232 for transmission across west-to-east status communications path 212. The segment packet and corresponding segment status packet are transmitted at about the same time to arrive at east RMAC device 202 at about the same time.

In addition, TX manager 218 processes acknowledgement frames and controls access to RS 226 and status interface 232. TX manager 218 receives the status of receive buffers for channels from RX manager 220, which receives the receive buffer status of channels from segment status packets transmitted by east RMAC device 202. TX manager 218 controls transmitting segments to channels based on the status of the destination channel receive buffer.

RX manager 220 is part of the MAC layer in west RMAC device 200. RX manager 220 communicates with RS 226 and status interface 232 and receives segment packets via RS 226 from east RMAC device 202 and corresponding segment status packets via status interface 232 from east RMAC device 202. RX manager 220 assembles the data for a channel from the segment packets and stores the assembled channel data into memory locations for the channel.

RX manager 220 also regulates the transmission data rate of each channel from west RMAC SPI 222 to a physical layer, such as west WAN physical layer 120 (shown in FIG. 2). To regulate the transmission data rate for a channel, RX manager 220 transmits data in data packets for a channel at a data rate, such as the data rate of the channel on the synchronous TDM network. The physical layer receives the data in data packets and transmits the data in synchronous TDM communication on the synchronous TDM network. In one embodiment, RX manager 220 transmits data for a channel in data packets at essentially the data rate of the channel on the synchronous TDM network.

RX manager 220 acquires segment information from the segment status packet for each segment in the corresponding segment packet. RX manager 220 uses the valid data length and segment status information to separate data segments from the segment packet. RX manager 220 uses the destination channel information to assemble the channel data and transmit the data to destination channels. RX manager 220 also transmits an acknowledgement frame to TX manager 218 that transmits the acknowledgement frame back to east RMAC device 202. In addition, RX manager 220 acquires the receive buffer status for the channel that originated the corresponding segment and transmits the receive buffer status to TX manager 218. If the receive buffer status is normal, TX manager 218 continues transmitting segments to the channel. If the receive buffer status is satisfy, TX manager 218 skips one transmission to the channel to prevent overflowing the receive buffer for that channel.

RS 226 operates as a command translator between TX manager 218 and XGMII 228. RS 226 adapts bit serial protocols of TX manager 218 to the parallel encodings of XGMII 228. Also, RS 226 adapts the parallel encodings of XGMII 228 to bit serial protocols of RX manager 220.

XGMII 228 provides a standard interconnection that supports 10 Gbps operations with a 32 bit wide transmit data path and a 32 bit wide receive data path. XGMII 228 includes 4 transmit control signals and a transmit clock, and 4 receive control signals and a receive clock to provide full duplex operation. Each direction of data transfer is independent and serviced by the independent data, control, and clock signals. XGMII 228 passes data and control signals between RS 226 and XAUI 230. The 32 bit wide transmit data and 4 transmit control signals are converted to four serial transmit paths in XAUI 230. The 32 bit wide receive data and 4 receive control signals are converted from four serial receive paths in XAUI 230. The conversions can be done in XGMII 228 and/or XAUI 230. In one embodiment, a 10 Gbps XGMII extender sub-layer (XGXS) is inserted between XGMII 228 and XAUI 230 to perform the conversions.

XGMII 228 balances the need for media independence with the need for a simple and cost effective interface. The bus width and signaling rate are applicable to short distance integrated circuit chip-to-chip interconnections with printed circuit board trace lengths electrically limited to about 7 centimeters (cm). XGMII 228 is described in IEEE Std 802.3ae entitled "Part 3: Carrier Sense Multiple Access with Collision Detection (CSMA/CD) Access Method and Physical Layer Specifications, Amendment: Media Access Control (MAC) Perimeters, Physical Layers, and Management Perimeters for 10 Gb/s Operation."

XAUI 230 extends the operational distance of the XGMII interface and reduces the number of interface signals. XAUI 230 provides an interconnection between XGMII 228 and XAUI 262 in east RMAC device 202. XAUI 230 and XAUI 262 extend the operational distance of the interface to 50 cm and can be used as an integrated circuit to integrated circuit interface implemented with traces on a printed circuit board. XAUI 230 transmits data to XAUI 262 via west-to-east data communications path 208 and XAUI 230 receives data from XAUI 262 via east-to-west data communications path 210.

XAUI 230 supports the 10 Gbps data rate of XGMII 228 through four differential pair transmit paths and four differential pair receive paths. Each of the transmit paths and each of the receive paths is a serial, independent data path that uses low voltage swing differential signaling. Thus, XAUI 230 includes four differential pair transmit paths or eight transmit lines and four differential pair receive paths or eight receive lines.

XGMII 228 is organized into four transmit lanes with each lane conveying a data octet on each edge of the associated clock, and four receive lanes with each lane conveying a data octet on each edge of the associated clock. Each of the four transmit lanes in XGMII 228 is transmitted across one of the four differential pair transmit paths in XAUI 230. Also, each of the four receive lanes in XGMII 228 is transmitted across one of the four differential pair receive paths in XAUI 230. XAUI 230 is further described in IEEE Std 802.3ae, previously referenced herein.

In other embodiments, west RMAC device 200 and east RMAC device 202 do not include XAUI 230 and XAUI 262. Instead, XGMII 228 is communicatively coupled to XGMII 260 via data communications path 204. In other embodiments, west RMAC device 200 and east RMAC device 202 include any suitable interface, such as a media independent interface (MII) that operates at less than 10 Gbps or more than 10 Gbps.

Status interface 232 provides an interconnection between TX manager 218 and status interface 264 in east RMAC device 202 and between RX manager 220 and status interface 264 in east RMAC device 202. Status interface 232 and status interface 264 can be used as an integrated circuit to integrated circuit interface implemented with traces on a printed circuit board. Status interface 232 and status interface 264 transmit and receive data in serial bit streams at about 1 Gbps. Status interface 232 transmits data to status interface 264 via west-to-east status communications path 212 and status interface 232 receives data from status interface 264 via east-to-west status communications path 214.

Status interface 232 receives segment status packets from status interface 264 via east-to-west status communications path 214 and passes the received segment status packets to RX manager 220. Status interface 232 receives segment status packets from TX manager 218 and transmits the received segment status packets to status interface 264 via west-to-east status communications path 212. A segment status packet and the corresponding segment packet are transmitted at about the same time to arrive at east RMAC device 202 at about the same time. In one embodiment, each segment status packet can be transmitted slightly ahead of its corresponding segment packet to arrive at east RMAC device 202 slightly ahead of the segment packet.

East RMAC SPI 254 is an asynchronous packet interface that receives data in data packets from a physical layer, such as east WAN physical layer 136 (shown in FIG. 2). Each of the data packets includes data from a channel in the synchronous TDM network. The data packets are passed to TX manager 250 that assembles the data for each channel into memory locations for that channel. East RMAC SPI 254 also receives data in data packets for channels in the synchronous TDM network from RX manager 252 and transmits the data packets to the physical layer, such as east WAN physical layer 136.

East RMAC network elements SPI 256 is an asynchronous packet interface that receives data in data packets from network elements, such as east network elements 112 (shown in FIG. 2). Each of the data packets includes data for a channel in the synchronous TDM network. The data packets are passed to TX manager 250 that assembles the data for each channel into memory locations for that channel. East RMAC network elements SPI 256 also receives data in data packets for network elements from TX manager 250 and transmits the data packets to the network elements, such as east network elements 112.

TX manager 250 is part of a media access control (MAC) layer in east RMAC device 202. TX manager 250 receives data packets from east RMAC SPI 254 and from east RMAC network elements SPI 256 and assembles the data for each channel into memory locations for that channel. TX manager 250 also regulates the transmission data rate for each channel from east RMAC mate interface 248 to west RMAC mate interface 216. In one embodiment, TX manager 250 transmits data for a channel at approximately the data rate of the channel on the synchronous TDM network.

TX manager 250 divides the data for each channel into data segments and inserts segments from different channels into a segment frame or packet. The segment packet includes timeslots and each timeslot in the segment packet carries a segment from one of the channels. To regulate the transmission data rate for a channel, TX manager 250 inserts and transmits segments from a channel at a data rate, such as the data rate of the channel on the synchronous TDM network.

TX manager 250 compiles segment information about each of the segments in a segment packet. The segment information includes valid data length, segment status, information about the segments destination channel, and the status of the receive buffer of the channel that originated the segment. TX manager 250 inserts the segment information into timeslots in a segment status packet. Each timeslot in the segment status packet carries segment information about one segment in a corresponding segment packet. The sequence of segment information in the segment status packet corresponds to the sequence of segments in the corresponding segment packet.

TX manager 250 transmits the segment packet to RS 258 and the segment status packet to status interface 264. The process of inserting segments into timeslots of a segment packet and inserting segment information into timeslots in a corresponding segment status packet continues for other data. TX manager 250 organizes the segment packets sequentially and presents them to RS 258 for transmission across east-to-west data communications path 210. Also, TX manager 250 organizes segment status packets sequentially and presents them to status interface 264 for transmission across east-to-west status communications path 214. The segment packet and corresponding segment status packet are transmitted at about the same time to arrive at west RMAC device 200 at about the same time.

In addition, TX manager 250 processes acknowledgement frames and controls access to RS 258 and status interface 264. TX manager 250 receives the status of receive buffers for channels via RX manager 252, which receives the receive buffer status of channels from segment status packets transmitted by west RMAC device 200. TX manager 250 controls transmitting segments to channels based on the status of the destination channel receive buffer.

RX manager 252 is part of the MAC layer in east RMAC device 202. RX manager 252 communicates with RS 258 and status interface 264 and receives segment packets via RS 258 from west RMAC device 200 and corresponding segment status packets via status interface 264 from west RMAC device 200. RX manager 252 assembles the data for a channel from the segment packets and stores the assembled channel data into memory locations for the channel.

RX manager 252 also regulates the transmission data rate of each channel from east RMAC SPI 254 to a physical layer, such as east WAN physical layer 136 (shown in FIG. 2). To regulate the transmission data rate for a channel, RX manager 252 transmits data in data packets for a channel at a data rate, such as the data rate of the channel on the synchronous TDM network. The physical layer receives the data in data packets and transmits the data in synchronous TDM communication on the synchronous TDM network. In one embodiment, RX manager 252 transmits data for a channel in data packets at essentially the data rate of the channel on the synchronous TDM network.

RX manager 252 acquires segment information from the segment status packet for each segment in the corresponding segment packet. RX manager 252 uses the valid data length and segment status information to separate data segments from the segment packet. RX manager 252 uses the destination channel information to assemble the channel data and transmit the data to destination channels. RX manager 252 also transmits an acknowledgement frame to TX manager 250 that transmits the acknowledgement frame back to west RMAC device 200. In addition, RX manager 252 acquires the receive buffer status for the channel that originated the corresponding segment and transmits the receive buffer status to TX manager 250. If the receive buffer status is normal, TX manager 250 continues transmitting segments to the channel. If the receive buffer status is satisfy, TX manager 250 skips one transmission to the channel to prevent overflowing the receive buffer for that channel.

RS 258 operates as a command translator between TX manager 250 and XGMII 260. RS 258 adapts bit serial protocols of TX manager 250 to the parallel encodings of XGMII 260. Also, RS 258 adapts the parallel encodings of XGMII 260 to bit serial protocols of RX manager 252.

XGMII 260 provides a standard interconnection that supports 10 Gbps operations with a 32 bit wide transmit data path and a 32 bit wide receive data path. XGMII 260 includes 4 transmit control signals and a transmit clock, and 4 receive control signals and a receive clock to provide full duplex operation. Each direction of data transfer is independent and serviced by the independent data, control, and clock signals. XGMII 260 passes data and control signals between RS 258 and XAUI 262. The 32 bit wide transmit data and 4 transmit control signals are converted to four serial transmit paths in XAUI 262. The 32 bit wide receive data and 4 receive control signals are converted from four serial receive paths in XAUI 262. The conversions can be done in XGMII 260 and/or XAUI 262. In one embodiment, a 10 Gbps XGMII extender sub-layer (XGXS) is inserted between XGMII 260 and XAUI 262 to perform the conversions.

XGMII 260 balances the need for media independence with the need for a simple and cost effective interface. The bus width and signaling rate are applicable to short distance integrated circuit chip-to-chip interconnections with printed circuit board trace lengths electrically limited to about 7 centimeters (cm). XGMII 260 is described in IEEE Std 802.3ae, previously referenced herein.

XAUI 262 extends the operational distance of the XGMII interface and reduces the number of interface signals. XAUI 262 provides an interconnection between XGMII 260 and XAUI 230 in west RMAC device 200. XAUI 230 and XAUI 262 extend the operational distance of the interface to 50 cm and can be used as an integrated circuit to integrated circuit interface implemented with traces on a printed circuit board. XAUI 262 transmits data to XAUI 230 via east-to-west data communications path 210 and XAUI 262 receives data from XAUI 230 via west-to-east data communications path 208.

XAUI 262 supports the 10 Gbps data rate of XGMII 260 through four differential pair transmit paths and four differential pair receive paths. Each of the transmit paths and each of the receive paths is a serial, independent data path that uses low voltage swing differential signaling. Thus, XAUI 262 includes four differential pair transmit paths or eight transmit lines and four differential pair receive paths or eight receive lines.

XGMII 260 is organized into four transmit lanes with each lane conveying a data octet on each edge of the associated clock, and four receive lanes with each lane conveying a data octet on each edge of the associated clock. Each of the four transmit lanes in XGMII 260 is transmitted across one of the four differential pair transmit paths in XAUI 262. Also, each of the four receive lanes in XGMII 260 is transmitted across one of the four differential pair receive paths in XAUI 262. XAUI 262 is further described in IEEE Std 802.3ae, previously referenced herein.

Status interface 264 provides an interconnection between TX manager 250 and status interface 232 in west RMAC device 200 and between RX manager 252 and status interface 232 in west RMAC device 200. Status interface 232 and status interface 264 can be used as an integrated circuit to integrated circuit interface implemented with traces on a printed circuit board. Status interface 232 and status interface 264 transmit and receive data in serial bit streams at about 1 Gbps. Status interface 264 transmits data to status interface 232 via east-to-west status communications path 214 and status interface 264 receives data from status interface 232 via west-to-east status communications path 212.

Status interface 264 receives segment status packets from status interface 232 via west-to-east status communications path 212 and passes the received segment status packets to RX manager 252. Status interface 264 receives segment status packets from TX manager 250 and transmits the received segment status packets to status interface 232 via east-to-west status communications path 214. A segment status packet and the corresponding segment packet are transmitted at about the same time to arrive at west RMAC device 200 at about the same time. In one embodiment, each segment status packet can be transmitted slightly ahead of its corresponding segment packet to arrive at west RMAC device 200 slightly ahead of the segment packet.

In operation of transmissions from west RMAC device 200 to east RMAC device 202, TX manager 218 receives data packets from west RMAC SPI 222 and west RMAC network elements SPI 224 and assembles data for each channel into memory locations for that channel. TX manager 218 divides the data for each channel into data segments and checks the receive buffer status for each segments destination channel. TX manager 218 inserts segments from different channels into a segment frame or packet. TX manager 218 only inserts segments with destination channels having a normal receive buffer status.

TX manager 218 compiles segment information about each of the segments in the segment packet and inserts the segment information into timeslots in a segment status packet that corresponds to the segment packet. The sequence of timeslots in the segment status packet corresponds to the sequence of segments in the segment packet. TX manager 218 presents segment packets sequentially to RS 226 for transmission across west-to-east data communications path 208 and TX manager 218 presents segment status packets sequentially to status interface 232 for transmission across west-to-east status communications path 212.

RS 226 maps each of the segment packets received from TX manager 218 to a format compatible with XGMII 228. RS 226 passes each of the segment packets to XGMII 228 that passes each of the segment packets to XAUI 230. XAUI 230 transmits each of the segment packets to XAUI 262 via west-to-east data communications path 208.

Status interface 232 receives each of the segment status packets and transmits each of the segment status packets to status interface 264 via west-to-east status communications path 212. Each segment packet and corresponding segment status packet arrives at east RMAC device 202 at about the same time. The process of inserting segments into timeslots of a segment packet and inserting segment information into timeslots in a corresponding segment status packet continues for other data.

XAUI 262 in east RMAC device 202 receives segment packets from XAUI 230, and status interface 264 in east RMAC device 202 receives the corresponding segment status packets from status interface 232. XAUI 262 passes received segment packets to RX manager 252 through XGMII 260 and RS 258. Status interface 264 passes received segment status packets to RX manager 252.

RX manager 252 divides segment information from the segment status packet and uses the valid data length and segment status to separate segments from the corresponding segment packet. RX manager 252 uses the destination channel information to assemble the data for a channel from the segment packets and store the assembled channel data into memory locations for the channel. RX manager 252 transmits the data to destination channels and an acknowledgement frame to TX manager 250 that transmits the acknowledgement frame back to west RMAC device 200. In addition, RX manager 252 acquires the receive buffer status for the channel that originated the corresponding segment and transmits the receive buffer status to TX manager 250.

RX manager 252 regulates the transmission data rate of each channel from east RMAC SPI 254 to a physical layer, such as east WAN physical layer 136 (shown in FIG. 2). To regulate the transmission data rate for a channel, RX manager 252 transmits data in data packets for a channel at a data rate, such as the data rate of the channel on the synchronous TDM network. The physical layer receives the data in data packets and transmits the data in synchronous TDM communication on the synchronous TDM network.

In operation of transmissions from east RMAC device 202 to west RMAC device 200, TX manager 250 receives data packets from east RMAC SPI 254 and east RMAC network elements SPI 256 and assembles data for each channel into memory locations for that channel. TX manager 250 divides the data for each channel into data segments and checks the receive buffer status for each segments destination channel. TX manager 250 inserts segments from different channels into a segment frame or packet. TX manager 250 only inserts segments with destination channels having a normal receive buffer status.

TX manager 250 compiles segment information about each of the segments in the segment packet and inserts the segment information into timeslots in a segment status packet that corresponds to the segment packet. The sequence of timeslots in the segment status packet corresponds to the sequence of segments in the segment packet. TX manager 250 presents segment packets sequentially to RS 258 for transmission across east-to-west data communications path 210 and TX manager 250 presents segment status packets sequentially to status interface 264 for transmission across east-to-west status communications path 214.

RS 258 maps each of the segment packets received from TX manager 250 to a format compatible with XGMII 260. RS 258 passes each of the segment packets to XGMII 260 that passes each of the segment packets to XAUI 262. XAUI 262 transmits each of the segment packets to XAUI 230 via east-to-west data communications path 210.

Status interface 264 receives each of the segment status packets and transmits each of the segment status packets to status interface 232 via east-to-west status communications path 214. Each segment packet and corresponding segment status packet arrives at west RMAC device 200 at about the same time. The process of inserting segments into timeslots of a segment packet and inserting segment information into timeslots in a corresponding segment status packet continues for other data.

XAUI 230 in west RMAC device 200 receives segment packets from XAUI 262, and status interface 232 in west RMAC device 200 receives the corresponding segment status packets from status interface 264. XAUI 230 passes received segment packets to RX manager 220 through XGMII 228 and RS 226. Status interface 232 passes received segment status packets to RX manager 220.

RX manager 220 divides segment information from the segment status packet and uses the valid data length and segment status to separate segments from the corresponding segment packet. RX manager 220 uses the destination channel information to assemble the data for a channel from the segment packets and store the assembled channel data into memory locations for the channel. RX manager 220 transmits the data to destination channels and an acknowledgement frame to TX manager 218 that transmits the acknowledgement frame back to east RMAC device 202. In addition, RX manager 220 acquires the receive buffer status for the channel that originated the corresponding segment and transmits the receive buffer status to TX manager 218.

RX manager 220 regulates the transmission data rate of each channel from west RMAC SPI 222 to a physical layer, such as west WAN physical layer 120 (shown in FIG. 2). To regulate the transmission data rate for a channel, RX manager 220 transmits data in data packets for a channel at a data rate, such as the data rate of the channel on the synchronous TDM network. The physical layer receives the data in data packets and transmits the data in synchronous TDM communication on the synchronous TDM network.

Figure 4:
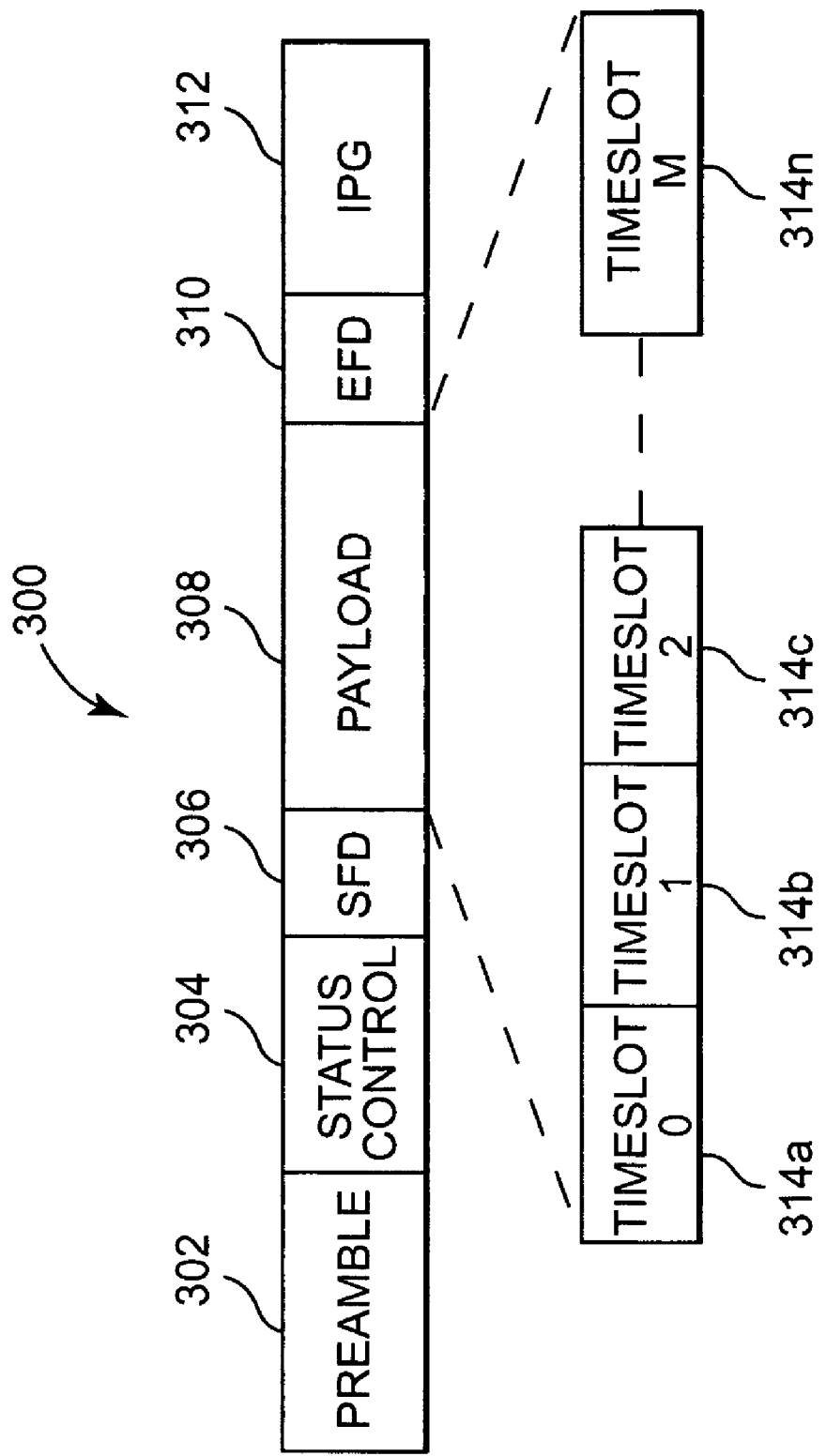
FIG. 4 is a diagram illustrating one embodiment of a segment packet.

FIG. 4 is a diagram illustrating one embodiment of a segment packet 300. Segment packet 300 includes a preamble 302, a status control field 304, a start of frame delimiter (SFD) 306, a payload 308, an end of frame delimiter (EFD) 310, and an inter packet gap (IPG) 312. Segment packet 300 is communicated between west RMAC device 200 and east RMAC device 202 via XAUI 230 and XAUI 262 (shown in FIG. 3).

Preamble 302 is a 6 byte field that begins a segment packet transmission. Preamble 302 is initiated by a TX manager, such as TX manager 218 or TX manager 250, and begins as six bytes in the following hexadecimal bit pattern: 0xAA AA AA AA AA AA. A reconciliation sub-layer, such as RS 226 and RS 258, converts the first byte of 0xAA into a one byte start control character that indicates the beginning of a segment packet. During reception, a reconciliation sub-layer converts the start control character back into 0xAA. In one embodiment, preamble 302 is a 7 byte field. In other embodiments, preamble 302 can be any suitable length.

Status control field 304 follows preamble 302 and is used to exchange synchronization messages between devices, such as west RMAC device 200 and east RMAC device 202. Status control field 304 sometimes includes a scan table synchronization byte that indicates the first segment in the first timeslot of payload 308 corresponds to the first channel entry in the indicated scan table. Each scan table includes channel identification entries and each of the paired devices, such as west RMAC device 200 and east RMAC device 202, includes transmit scan tables and receive scan tables. The transmit scan tables in one device correspond to the receive scan tables in the other device, such that corresponding scan tables include channel identification entries in the same sequence.

The transmitting device selects a channel identification entry at a pointer into a transmit scan table and increments the pointer to the next entry. A data segment from the selected channel is transmitted in a segment packet. Also, segment information that includes destination channel information for the data segment is transmitted in the corresponding segment status packet.

The receiving device receives the segment packet and the corresponding segment status packet that includes the destination channel information for the data segment in the segment packet. The destination channel information is a scan table identifier that is passed to the receiving device. A pointer into the identified scan table points to the channel for the data segment and the pointer is incremented. The scan table synchronization byte ensures that pointers into corresponding scan tables in the transmitting and receiving devices are synchronized to ensure that segments are sent to the correct channel. Scan tables and scan table synchronization is described in further detail later herein.

Also, status control field 304 sometimes includes a link capacity adjustment scheme (LCAS) byte that indicates which LCAS to use. In one embodiment, each device includes two LCAS configuration sets, one active and one shadow LCAS. A swap between the active and the shadow LCAS can be done remotely through status control field 304. In one embodiment, status control field 304 is a 1 byte field. In other embodiments, status control field 304 can be any suitable length.

SFD 306 follows status control field 304 and indicates the start of payload 308. In one embodiment, SFD 306 is a 1 byte field. In other embodiments, SFD 306 can be any suitable length. In one embodiment, SFD 306 is a hexadecimal 0xAB. In other embodiments, SFD 306 can be any suitable bit pattern.

Payload 308 follows SFD 306 and includes M+1 timeslots 314a-314n that can include segments from different channels. Each of the timeslots 314a-314n carries a segment from one channel. In one embodiment, M equals 511 and payload 308 includes 512 timeslots. In one embodiment, each of the timeslots 314a-314n is 16 bytes long. In one embodiment, M equals 511 and each of the timeslots 314a-314n is 16 bytes long, such that payload 308 includes 8192 bytes. In other embodiments, M can be any suitable number and each timeslot can be any suitable length, such as 8 bytes or 32 bytes long.

EFD 310 follows payload 308 and indicates the end of payload 308. EFD 310 can be any suitable bit pattern. In one embodiment, EFD 310 is a 1 byte field. In other embodiments, EFD 310 can be any suitable length.

IPG 312 follows EFD 310 and precedes the next segment packet preamble. IPG 312 inserts a delay or time gap between segment packets. This delay provides inter-packet recovery time for OSI layers and the physical medium. In one embodiment, IPG 312 is 11 bytes. In other embodiments, IPG 312 can be any suitable length.

Figure 5:
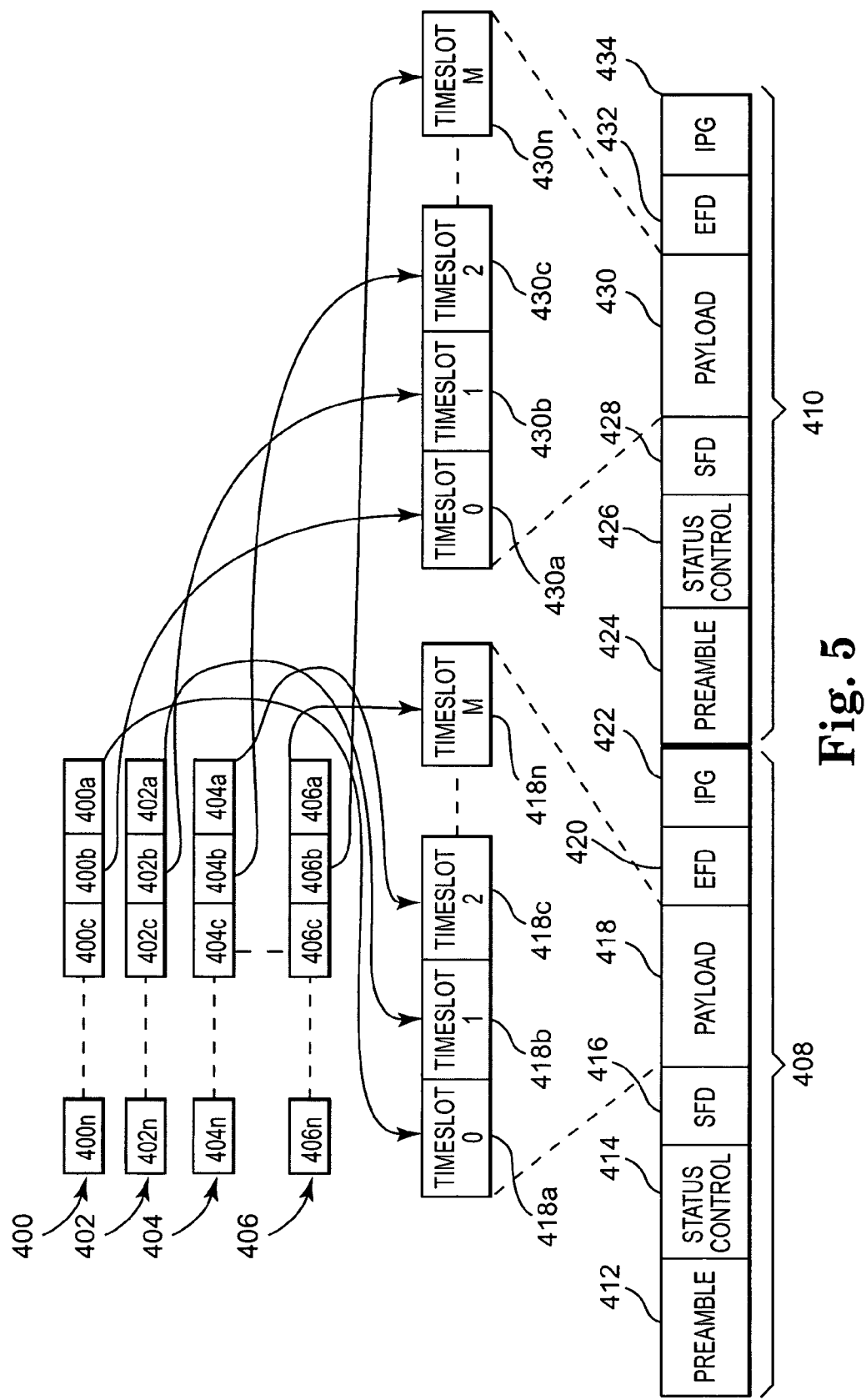
FIG. 5 is a diagram illustrating one example of segmenting and framing channel payloads into segment packets in one embodiment of a device.

FIG. 5 is a diagram illustrating one example of segmenting and framing channel payloads 400, 402, and 404 to 406 into segment packets 408 and 410 in one embodiment of a device, such as west RMAC device 200 or east RMAC device 202 (shown in FIG. 3). Each of the channel payloads 400, 402, and 404 to 406 is for a channel in the synchronous TDM network and each of the channel payloads 400, 402, and 404 to 406 is received by the TX manager in the device. In west RMAC device 200, each of the channel payloads 400, 402, and 404 to 406 is received by TX manager 218. In east RMAC device 202, each of the channel payloads 400, 402, and 404 to 406 is received by TX manager 250. In one embodiment, at least two of the channel payloads 400, 402, and 404 to 406 are for different channels. In one embodiment, each of the channel payloads 400, 402, and 404 to 406 is for a different channel.

The TX manager divides channel payloads 400, 402, and 404 to 406 into segments. Channel payload 400 is divided into segments 400a-400n, channel payload 402 is divided into segments 402a-402n, channel payload 404 is divided into segments 404a-404n, and channel payload 406 is divided into segments 406a-406n. Channel payloads between channel payload 404 and channel payload 406 are also divided into segments. In one embodiment, each of the channel payloads 400, 402, and 404 to 406 is divided into segments that are each 16 bytes long. In other embodiments, each of the channel payloads 400, 402, and 404 to 406 is divided into segments that are any suitable length.

Each of the segment packets 408 and 410 is similar to segment packet 300 of FIG. 4. Segment packet 408 includes preamble 412, status control field 414, SFD 416, payload 418, EFD 420, and IPG 422. Segment packet 410 includes preamble 424, status control field 426, SFD 428, payload 430, EFD 432, and IPG 434. Each of the components of segment packets 408 and 410 is similar to the corresponding component in segment packet 300 described herein. The TX manager frames segments 400a-400n, 402a-402n, and 404a-404n to 406a-406n into payloads of segment packets, such as payloads 418 and 430 of segment packets 408 and 410.

Payload 418 includes M+1 timeslots 418a-418n and payload 430 includes M+1 timeslots 430a-430n. Each of the timeslots 418a-418n and 430a-430n can carry one of the segments 400a-400n, 402a-402n, and 404a-404n to 406a-406n. In one embodiment, M equals 511 and each of the payloads 418 and 430 includes 512 timeslots. In one embodiment, each of the timeslots 418a-418n and 430a-430n is 16 bytes long. In one embodiment, M equals 511 and each of the timeslots 418a-418n and 430a-430n is 16 bytes long, such that each of the payloads 418 and 430 includes 8192 bytes. In other embodiments, M can be any suitable number and each timeslot can be any suitable length, such as 8 bytes or 32 bytes long.

The TX manager inserts segments 400a-400n, 402a-402n, and 404a-404n to 406a-406n into timeslots such as timeslots 418a-418n and 430a-430n. In one embodiment, the TX manager inserts one of the segments 400a-400n, 402a-402n, and 404a-404n to 406a-406n into one of the timeslots 418a-418n and 430a-430n. In one embodiment, the TX manager can insert more than one of the segments 400a-400n, 402a-402n, and 404a-404n to 406a-406n into one of the timeslots 418a-418n and 430a-430n, where the multiple segments in one timeslot are from one channel.

In one example operation, the TX manager inserts segment 400a into timeslot 0 at 418a, segment 402a into timeslot 1 at 418b, segment 404a into timeslot 2 at 418c, and on, up to segment 406a into timeslot M at 418n. After payload 418 is framed, segment packet 408 can be transmitted to another device. Next, the TX manager inserts segment 400b into timeslot 0 at 430a, segment 402b into timeslot 1 at 430b, segment 404b into timeslot 2 at 430c, and on, up to segment 406b into timeslot M at 430n. After payload 430 is framed, segment packet 410 can be transmitted to another device. Framing continues until all of the segments 400a-400n, 402a-402n, and 404a-404n to 406a-406n in channel payloads 400, 402, and 404 to 406 have been inserted into segment packets, such as segment packets 408 and 410.

Each of the segment packets 408 and 410 is transmitted to another device and received by an RX manager, such as RX manager 220 or RX manager 252. The RX manager divides out segment information from the corresponding segment status packet and uses the valid data length and segment status to separate segments 400a-400n, 402a-402n, and 404a-404n to 406a-406n from segment packets, such as segment packets 408 and 410. Segments 400a-400n, 402a-402n, and 404a-404n to 406a-406n are reassembled into channel payloads 400, 402, and 404 to 406 by the RX manager and transmitted to a physical layer and the synchronous TDM network.

Figure 6:
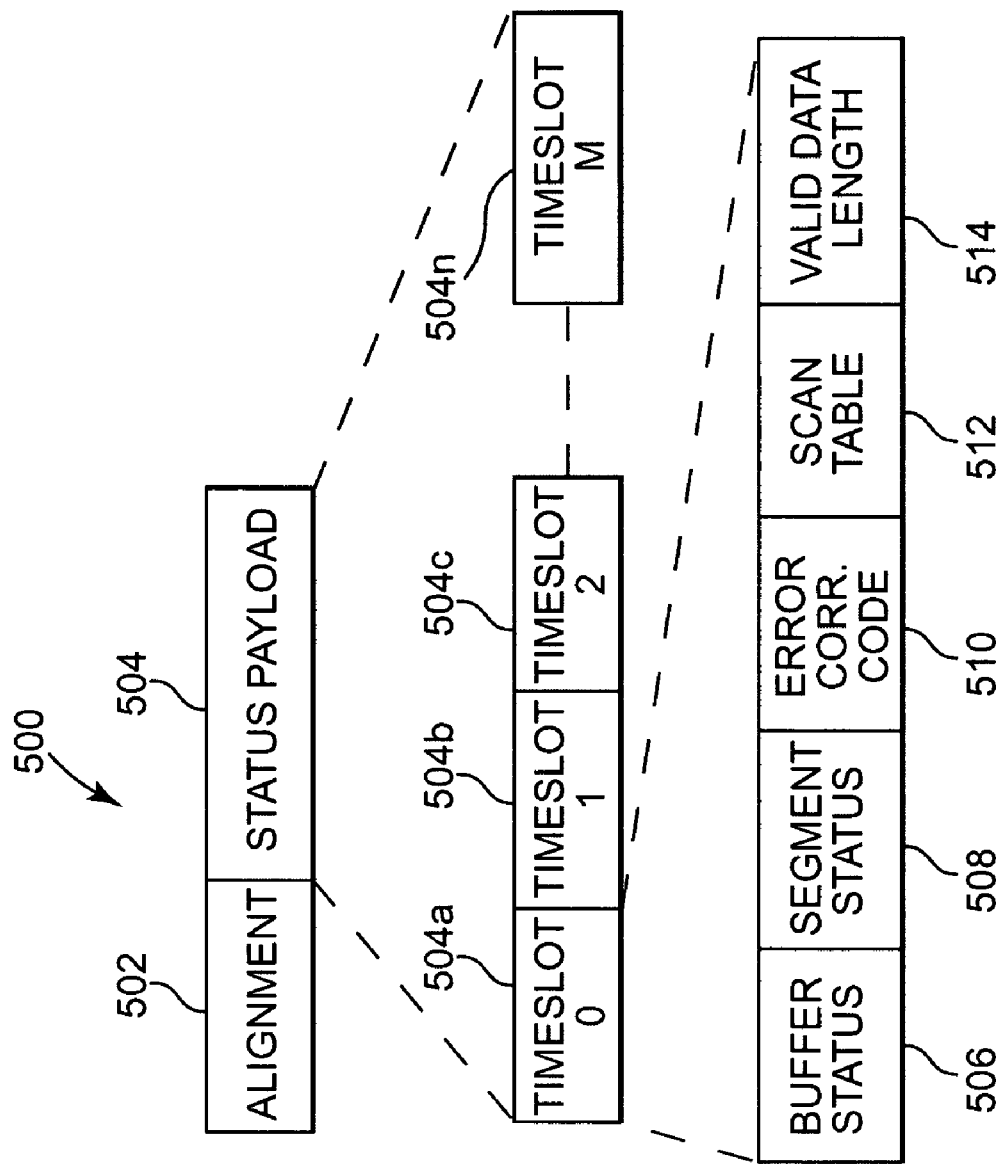
FIG. 6 is a diagram illustrating one embodiment of a segment status packet.

FIG. 6 is a diagram illustrating one embodiment of a segment status packet 500. The segment status packet 500 includes a frame alignment field 502 and a status payload 504. Each segment status packet, such as segment status packet 500, corresponds to one segment packet, such as segment packet 408 or segment packet 410 (shown in FIG. 5). The segment status packet 500 carries segment information about each of the segments in the corresponding segment packet. Segment status packet 500 and the corresponding segment packet are transmitted at about the same time to arrive at the receiving device at about the same time. Segment status packet 500 is communicated between west RMAC device 200 and east RMAC device 202 via status interface 232 and status interface 264 (shown in FIG. 3). In one embodiment, segment packets, such as segment packets 408 and 410, are transmitted at 10 Gbps and segment status packets, such as segment status packet 500, are transmitted at 1 Gbps.

Frame alignment field 502 is a 2 byte (16 bit) field that begins a transmission of a segment status packet 500. Frame alignment field 502 is used for synchronization of the segment status packet 500 at the receiving device. The 2 byte hexadecimal bit pattern is 0xFC 03 transmitted from left to right, where the last eight bits are the complement of the first eight bits and mark the start of status payload 504. The hexadecimal sequence 0xFC is repeated continuously where bit stuffing is needed to synchronize segment status packet 500 with its corresponding segment packet and to maintain a designated bit rate, such as 1 Gbps. In other embodiments, frame alignment field 502 can be any suitable length. Also, in other embodiments, frame alignment field 502 can be any suitable bit pattern.

Status payload 504 follows frame alignment field 502 and includes M+1 timeslots 504a-504n. In one embodiment, M equals 511 and status payload 504 includes 512 timeslots. In one embodiment, each of the timeslots 504a-504n is 10 bits long. In another embodiment, each of the timeslots 504a-504n could be greater than 10 bits. In one embodiment, M equals 511 and each of the timeslots 504a-504n is 10 bits long, such that status payload 504 includes 640 bytes (5120 bits). In other embodiments, M can be any suitable number and each timeslot can be any suitable length.

The timeslots 504a-504n correspond one to one with timeslots in the corresponding segment packet. For example, if segment packet 408 (shown in FIG. 5) is the corresponding segment packet for segment status packet 500, timeslots 504a-504n correspond one to one with timeslots 418a-418n in segment packet 408. Timeslot 504a carries segment information about the segment in timeslot 418a, timeslot 504b carries segment information about the segment in timeslot 418b, timeslot 504c carries segment information about the segment in timeslot 418c, and so on, up to timeslot 504n that carries segment information about the segment in timeslot 418n. In one embodiment with segment packet 408 being much longer than segment status packet 500, the segment packet 408 is transmitted at 10 Gbps and segment status packet 500 is transmitted at 1 Gbps and each of the timeslots 418a-418n in payload 418 is received at the receiving device at about the same time as each of the corresponding timeslots 504a-504n in status payload 504.

Each of the timeslots 504a-504n includes a receive buffer status field 506, a segment status field 508, an error correction code field 510, a scan table identification field 512, and a valid data length field 514. In one embodiment, each of the timeslots 504a-504n is 10 bits long with a receive buffer status field 506 of 1 bit, segment status field 508 of 2 bits, error correction code field 510 of 1 bit, scan table identification field 512 of 2 bits, and valid data length field 514 of 4 bits.

The receive buffer status field 506 indicates the receive buffer status for the channel that originated the segment in the corresponding segment packet timeslot. The receive buffer status is transmitted from the RX manager to the TX manager and can be either satisfy or normal. If the receive buffer status field 506 indicates that the receive buffer status is satisfy, the TX manager skips a transmission of one or more segments to the channel. If the receive buffer status field 506 indicates that the receive buffer is normal, the TX manager continues to transmit segments to the channel. In one embodiment, the receive buffer status field is 1 bit. In other embodiments, the receive buffer status field can be any suitable length.

The scan table identification field 512 and the error correction code field 510 indicate the channel of the segment in the segment packet, which corresponds to the timeslot 504a-504n in the status payload 504. The scan table identification field 512 indicates the scan table that contains the channel identification entry for the segment. A pointer into the identified scan table points to the channel that is the destination channel for the segment. Also, the pointer into the identified scan table is incremented. To ensure that corresponding scan tables are kept synchronized, error correction code field 510 provides error correction code data that is used to correct errors in the scan table identification field 512. In one embodiment, the scan table identification field 512 is 2 bits long and the error correction code field is 1 bit long. In other embodiments, the scan table identification field 512 can be any suitable length and the error correction code field 510 can be any suitable length.

The segment status field 508 provides status about the segment in the segment packet, which corresponds to the timeslot 504a-504n in the status payload 504. The segment status field 508 indicates whether the segment is errored, the end of a channel payload, all valid, or all invalid. The segment status field 508 and valid data length field 514 are used to separate valid bytes from invalid bytes and to indicate the beginning of a new channel payload for the channel. In addition, in certain situations, the valid data length field 514 is used for other purposes, such as indicating the status of a transit queue or carrying control commands to the receiving device. In one embodiment, the segment status field 508 is 2 bits. In one embodiment, the valid data length field 514 is 4 bits. In other embodiments, the segment status field 508 can be any suitable length and the valid data length field 514 can be any suitable length.

If the segment status field 508 indicates that the segment is errored, the valid data length field 514 indicates the number of valid bytes in the segment timeslot. The transmitting TX manager inserts a status byte in the segment timeslot after the last valid byte and if the inserted status byte indicates a new channel payload, the remaining bytes in the corresponding timeslot are valid. If the status byte does not indicate a new channel payload, the remaining bytes are invalid.

If the segment status field 508 indicates the segment is the end of a channel payload, the valid data length field 514 indicates the number of valid bytes. The transmitting TX manager inserts a status byte in the segment timeslot after the last valid byte and if the status byte indicates a new channel payload, the remaining bytes in the segment timeslot are valid. If the status byte does not indicate a new channel payload, the remaining bytes are invalid.

If the segment status field 508 indicates that all bytes in the segment timeslot are valid, the valid data length field 514 can be used for other purposes, such as indicating the status of a transit queue or carrying control commands to the receiving device. Also, if the segment status field 508 indicates that all bytes in the segment timeslot are invalid, the valid data length field 514 can be used for other purposes, such as indicating the status of a transit queue or carrying control commands to the receiving device.

Figure 7:
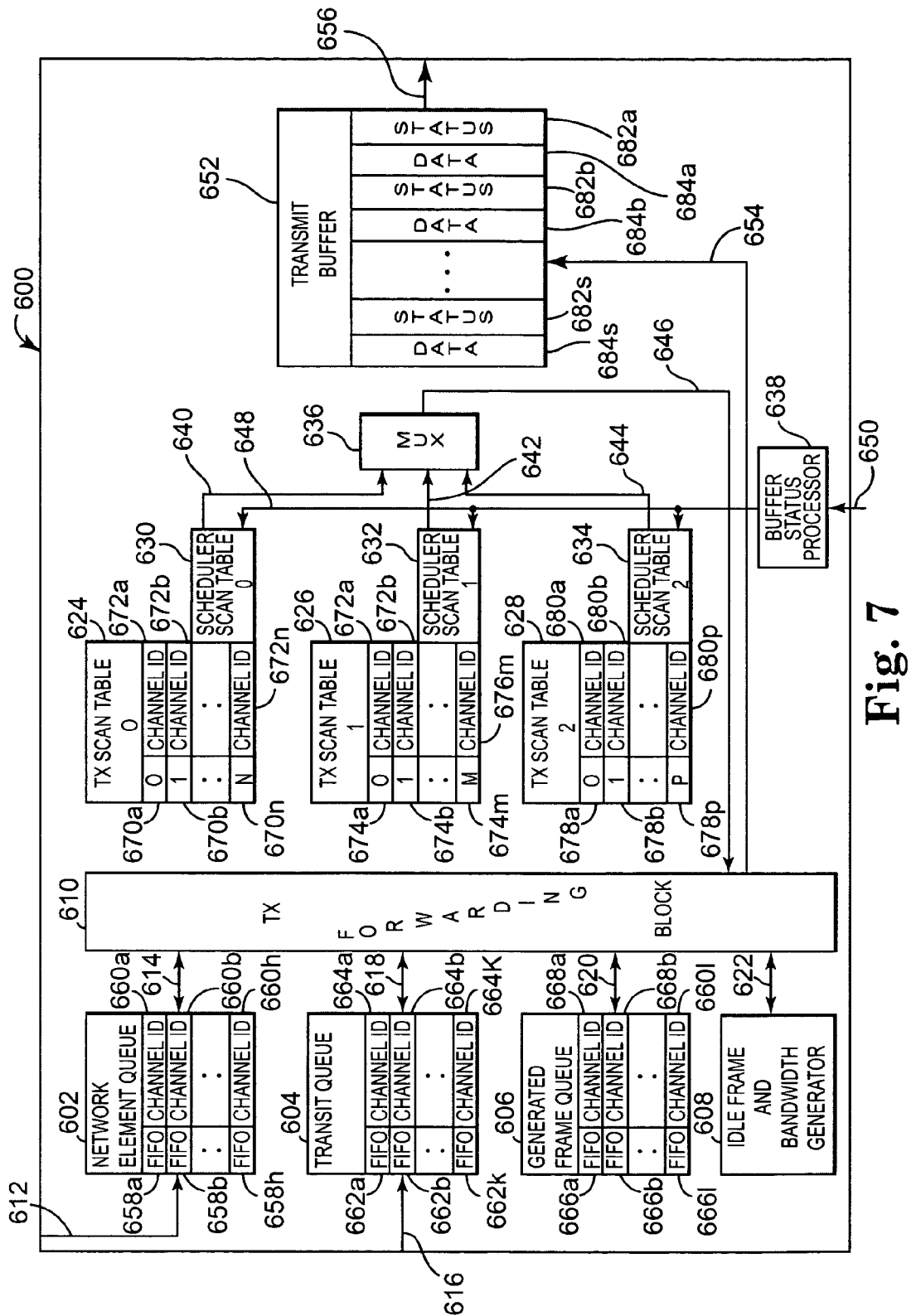
FIG. 7 is a diagram illustrating one embodiment of a transmit (TX) manager.

FIG. 7 is a diagram illustrating one embodiment of a TX manager 600. TX manger 600 is similar to TX manager 218 (shown in FIG. 3) and TX manager 250 (shown in FIG. 3). TX manager 600 is part of a MAC layer that receives data packets via asynchronous packet communication and assembles data from a channel into a memory location for that channel. Also, TX manager 600 regulates the data rate for each channel. In one embodiment, TX manager 600 transmits data for a channel at approximately the data rate of the channel on the synchronous TDM network.

TX manager 600 includes a network element queue 602, a transit queue 604, a generated frame queue 606, an idle frame and bandwidth generator 608, and a TX forwarding block 610. The network element queue 602 is communicatively coupled to receive data from network elements via network element communications path 612. Also, network element queue 602 is communicatively coupled to TX forwarding block 610 via queue communications path 614. Transit queue 604 is communicatively coupled to receive data from the physical layer and synchronous TDM network via TX communications path 616. Also, transit queue 604 is communicatively coupled to TX forwarding block 610 via queue communications path 618. Generated frame queue 606 is communicatively coupled to TX forwarding block 610 via queue communications path 620, and idle frame and bandwidth generator 608 is communicatively coupled to TX forwarding block 610 via queue communications path 622.

TX manager 600 includes TX scan table 0 at 624, TX scan table 1 at 626, TX scan table 2 at 628, scan table 0 scheduler 630, scan table 1 scheduler 632, scan table 2 scheduler 634, a multiplexer 636, and a buffer status processor 638. Each of the TX scan tables 624, 626, and 628 is communicatively coupled to one of the scan table schedulers 630, 632, and 634. TX scan table 0 at 624 is communicatively coupled to scan table 0 scheduler 630, TX scan table 1 at 626 is communicatively coupled to scan table 1 scheduler 632, and TX scan table 2 at 628 is communicatively coupled to scan table 2 scheduler 634. Scan table 0 scheduler 630 is communicatively coupled to multiplexer 636 via scheduler communications path 640. Scan table 1 scheduler 632 is communicatively coupled to multiplexer 636 via scheduler communications path 642. Scan table 2 scheduler 634 is communicatively coupled to multiplexer 636 via scheduler communications path 644. Also, multiplexer 636 is communicatively coupled to TX forwarding block 610 via multiplexer communications path 646. In addition, buffer status processor 638 is communicatively coupled to each of the scan table schedulers 630, 632, and 634 via communications path 648 and to an RX manager, such as RX manger 220 (shown in FIG. 3) and RX manager 252 (shown in FIG. 3) via status path 650.

Also, TX manager 600 includes a transmit buffer 652. TX forwarding block 610 is communicatively coupled to transmit buffer 652 via transmit buffer communications path 654. Transmit buffer 652 transmits data to a mate interface, such as mate interface 216 (shown in FIG. 3) or mate interface 248 (shown in FIG. 3), via TX communications path 656.

Network element queue 602 stores data received in data packets from network elements via network element communications path 612. TX manager 600 receives the data packets in asynchronous packet communication and stores the data in network element queue 602. The data is stored in first-in-first-out (FIFO) memories 658a-658h associated with channel identifications 660a-660h. Each of the FIFO memories 658a-658h is associated with one of the channel identifications 660a-660h. FIFO memory 658a is associated with channel identification 660a, FIFO memory 658b is associated with channel identification 660b, and so on, up to FIFO memory 658h being associated with channel identification 660h. Each of the FIFO memories 658a-658h stores data for the channel identified by the corresponding one of the channel identifications 660a-660h. Channel identifications 660a-660h identify channels on the synchronous TDM network. In one embodiment, each of the channel identifications 660a-660h is different from other channel identifications 660a-660h.

Transit queue 604 stores data received in data packets from a physical layer via TX communications path 616. The physical layer receives the data via synchronous TDM communication with the synchronous network. TX manager 600 receives the data packets in asynchronous packet communication and stores the data in transit queue 604. The data is stored in first-in-first-out (FIFO) memories 662a-662k associated with channel identifications 664a-664k. Each of the FIFO memories 662a-662k is associated with one of the channel identifications 664a-664k. FIFO memory 662a is associated with channel identification 664a, FIFO memory 662b is associated with channel identification 664b, and so on, up to FIFO memory 662k being associated with channel identification 664k. Each of the FIFO memories 662a-662k stores data for the channel identified by the corresponding one of the channel identifications 664a-664k. Channel identifications 664a-664k identify channels on the synchronous TDM network. In one embodiment, each of the channel identifications 664a-664k is different from other channel identifications 664a-664k.

Generated frame queue 606 stores data generated to control communications on the mate interface and the synchronous TDM network. The generated data includes fairness frames, such as single choke fairness frames, and control frames. The fairness frames are generated to eliminate or reduce congestion on the synchronous TDM network by adjusting channel bandwidth to fit available network bandwidth. Control frames can include acknowledgement frames that acknowledge receipt of data through the mate interface from another device. The generated data is stored in generated frame queue 606 in first-in-first-out (FIFO) memories 666a-666l associated with channel identifications 668a-668l. Each of the FIFO memories 666a-666l is associated with one of the channel identifications 668a-668l. FIFO memory 666a is associated with channel identification 668a, FIFO memory 666b is associated with channel identification 668b, and so on, up to FIFO memory 666l being associated with channel identification 668l. Each of the FIFO memories 666a-666l stores data for the channel identified by the corresponding one of the channel identifications 668a-668l. Channel identifications 668a-668l identify channels on the synchronous TDM network. In one embodiment, each of the channel identifications 664a-664l is different from other channel identifications 664a-664l.

Channel identifications 660a-660h, channel identifications 664a-664k, and channel identifications 668a-668l identify channels on the synchronous TDM network. In one embodiment, the same channel can be identified in channel identifications 660a-660h, channel identifications 664a-664k, and/or channel identifications 668a-668l.

Idle frame and bandwidth generator 608 generates frames and reserves bandwidth on the mate interface and the synchronous TDM network. Idle frames are generated to fill bandwidth on the mate interface and/or the synchronous TDM network. Bandwidth is reserved on the mate interface and the synchronous TDM network for generic framing procedure (GFP) overhead bytes on the synchronous TDM network.

TX forwarding block 610 obtains data from the network element queue 602, transit queue 604, generated frame queue 606, and idle frame and bandwidth generator 608 and provides data segment packets and segment status packets to transmit buffer 652. TX forwarding block 610 receives channel identification signals from multiplexer 636 and in response obtains data for the channel indicated by the received channel identification signals from the network element queue 602, transit queue 604, or generated frame queue 606.

In one embodiment, TX forwarding block 610 obtains the data from the network element queue 602, transit queue 604, or generated frame queue 606 and divides the data for each channel into data segments. TX forwarding block 610 inserts segments from different channels into a segment packet. Also, TX forwarding block 610 compiles segment information about each of the segments in the segment packet and inserts the segment information into timeslots in a segment status packet that corresponds to the segment packet. The sequence of timeslots in the segment status packet corresponds to the sequence of segments in the segment packet. TX forwarding block 610 provides segment packets and segment status packets to transmit buffer 652.

TX scan table 0 at 624 is communicatively coupled to scan table 0 scheduler 630 and includes scan table entries 670a-670n and channel identifications 672a-672n. Each of the scan table entries 670a-670n is associated with one of the channel identifications 672a-672n. Scan table entry 670a is associated with channel identification 672a, scan table entry 670b is associated with channel identification 672b, and scan table entry 670n is associated with channel identification 672n. Channel identifications 672a-672n identify channels on the synchronous TDM network. In addition, channel identifications 672a-672n can be no operation entries. A pointer into TX scan table 0 at 624 points to one of the scan table entries 670a-670n and to the corresponding one of the channel identifications 672a-672n.

Scan table 0 scheduler 630 includes a polling mechanism that includes a timer, which periodically indicates the end of a timed period. The polling mechanism operates independently of other polling mechanisms in TX manager 600. At the end of the timed period, scan table 0 scheduler 630 increments the pointer into TX scan table 0 at 624. In one embodiment, the pointer is incremented in a round robin scheme from scan table entry 670a to scan table entry 670b and so on, up to scan table entry 670n, and the pointer is incremented from the last scan table entry 670n to the first scan table entry 670a in TX scan table 0 at 624.

The pointer points to one of the scan table entries 670a-670n and the corresponding one of the channel identifications 672a-672n, which is provided to multiplexer 636 and TX forwarding block 610. The TX forwarding block 610 obtains a data segment for the identified channel and assembles the data segment into a data segment packet that is sent to transmit buffer 652 and transmitted over a mate interface, such as mate interface 216 (shown in FIG. 3) or mate interface 248 (shown in FIG. 3). TX forwarding block 610 can obtain idle frames or segments if the corresponding one of the channel identifications 672a-672n is a no operation entry. In one embodiment, the corresponding one of the channel identifications 672a-672n is provided to either the TX forwarding block 610 to transmit data from transmit buffer 652 over a mate interface or to a transmit buffer to transmit data through an SPI interface, such as west RMAC SPI 222 (shown in FIG. 3) and east RMAC SPI 254 (shown in FIG. 3). In one embodiment, TX scan table 0 at 624 and scan table 0 scheduler 630 operate at the equivalent of the synchronous transport signal 1/virtual concatenation 3 (STS-1/VC-3) data rate.

Buffer status processor 638 obtains receive buffer status signals of normal or satisfy from the RX manager, such as RX manager 220 (shown in FIG. 3) and RX manager 252 (shown in FIG. 3). Buffer status processor 638 and scan table 0 scheduler 630 flag channels that have a receive buffer status of satisfy and prevent channel identifications 672a-672n of the flagged channels from being sent to multiplexer 636 and TX forwarding block 610.

In one embodiment, TX scan table 0 at 624 and scan table 0 scheduler 630 operate in the 10 Giga bit per second (Gbps) mode. In this mode, n equals 192 and TX scan table 0 at 624 includes 192 scan table entries 670a-670n and 192 corresponding channel identifications 672a-672n. Also, scan table 0 scheduler 630 indicates the end of a timed period every 13.30353 nanoseconds. A different one of the scan table entries 670a-670n is selected every 13.30353 nanoseconds and each of the scan table entries 670a-670n is selected about once every 2.55 microseconds. If a 16 byte segment for a channel is transmitted every 2.55 microseconds, the data rate for the channel is about 50 mega bits per second (Mbps). Other data rates can be obtained by having multiple entries of the same channel in channel identifications 672a-672n. For example, if TX scan table 0 at 624 includes three entries for one channel in channel identifications 672a-672n, the data rate is about 150 Mbps for the channel.

In one embodiment, TX scan table 0 at 624 and scan table 0 scheduler 630 operate in the 2.5 bps mode. In this mode, n equals 48 and TX scan table 0 at 624 includes 48 scan table entries 670a-670n and 48 channel identifications 672a-672n. Scan table 0 scheduler 630 indicates the end of a timed period of 53.21413 nanoseconds. A different one of the scan table entries 670a-670n is selected every 53.21413 nanoseconds and each of the scan table entries 670a-670n is selected about once every 2.55 microseconds. If a 16 byte segment for a channel is transmitted every 2.55 microseconds, the data rate for the channel is about 50 Mbps. Other data rates can be obtained by having multiple entries of the same channel in channel identifications 672a-672n. For example, if TX scan table 0 at 624 includes three entries for one channel in channel identifications 672a-672n, the data rate is about 150 Mbps for the channel.

TX scan table 1 at 626 is communicatively coupled to scan table 1 scheduler 632 and includes scan table entries 674a-674m and channel identifications 676a-676m. Each of the scan table entries 674a-674m is associated with one of the channel identifications 676a-676m. Scan table entry 674a is associated with channel identification 676a, scan table entry 674b is associated with channel identification 676b, and scan table entry 674m is associated with channel identification 676m. Channel identifications 676a-676m identify channels on the synchronous TDM network. In addition, channel identifications 676a-676m can be no operation entries. A pointer into TX scan table 1 at 626 points to one of the scan table entries 674a-674m and to the corresponding one of the channel identifications 676a-676m.

Scan table 1 scheduler 632 includes a polling mechanism that includes a timer, which periodically indicates the end of a timed period. The polling mechanism operates independently of other polling mechanisms in TX manager 600. At the end of the timed period, scan table 1 scheduler 632 increments the pointer into TX scan table 1 at 626. In one embodiment, the pointer is incremented in a round robin scheme from scan table entry 674a to scan table entry 674b and so on, up to scan table entry 674m, and the pointer is incremented from the last scan table entry 674m to the first scan table entry 674a in TX scan table 1 at 626.

The pointer points to one of the scan table entries 674a-674m and the corresponding one of the channel identifications 676a-676m, which is provided to multiplexer 636 and TX forwarding block 610. The TX forwarding block 610 obtains a data segment for the identified channel and assembles the data segment into a data segment packet that is sent to transmit buffer 652 and transmitted over a mate interface, such as mate interface 216 (shown in FIG. 3) or mate interface 248 (shown in FIG. 3). TX forwarding block 610 can obtain idle frames or segments if the corresponding one of the channel identifications 676a-676m is a no operation entry. In one embodiment, the corresponding one of the channel identifications 676a-676m is provided to either the TX forwarding block 610 to transmit data from transmit buffer 652 over a mate interface or to a transmit buffer to transmit data through an SPI interface, such as west RMAC SPI 222 (shown in FIG. 3) and east RMAC SPI 254 (shown in FIG. 3). In one embodiment, TX scan table 1 at 626 and scan table 1 scheduler 632 operate at the equivalent of the virtual tributary 2/tributary unit 12 (VT2/TU-12) data rate.

Buffer status processor 638 obtains receive buffer status signals of normal or satisfy from the RX manager, such as RX manager 220 (shown in FIG. 3) and RX manager 252 (shown in FIG. 3). Buffer status processor 638 and scan table 1 scheduler 632 flag channels that have a receive buffer status of satisfy and prevent channel identifications 676a-676m of the flagged channels from being sent to multiplexer 636 and TX forwarding block 610.

In one embodiment, TX scan table 1 at 626 and scan table 1 scheduler 632 operate in the 10 Giga bit per second (Gbps) mode. In this mode, n equals 4032 and TX scan table 1 at 626 includes 4032 scan table entries 674a-674m and 4032 corresponding channel identifications 676a-676m. Also, scan table 1 scheduler 632 indicates the end of a timed period every 13.77865 nanoseconds. A different one of the scan table entries 674a-674m is selected every 13.77865 nanoseconds and each of the scan table entries 674a-674m is selected about once every 55.56 microseconds. If a 16 byte segment for a channel is transmitted every 55.56 microseconds, the data rate for the channel is about 2.304 Mbps. Other data rates can be obtained by having multiple entries of the same channel in channel identifications 676a-676m. For example, if TX scan table 1 at 626 includes three entries for one channel in channel identifications 676a-676m, the data rate is about 6.91 Mbps for the channel.

In one embodiment, TX scan table 1 at 626 and scan table 1 scheduler 632 operate in the 2.5 Gbps mode. In this mode, n equals 1008 and TX scan table 1 at 626 includes 1008 scan table entries 674a-674m and 1008 channel identifications 676a-676m. Scan table 1 scheduler 632 indicates the end of a timed period of 55.11464 nanoseconds. A different one of the scan table entries 674a-674m is selected every 55.11464 nanoseconds and each of the scan table entries 674a-674m is selected about once every 55.56 microseconds. If a 16 byte segment for a channel is transmitted every 55.56 microseconds, the data rate for the channel is about 2.304 Mbps. Other data rates can be obtained by having multiple entries of the same channel in channel identifications 676a-676m.

TX scan table 2 at 628 is communicatively coupled to scan table 2 scheduler 634 and includes scan table entries 678a-678p and channel identifications 680a-680p. Each of the scan table entries 678a-678p is associated with one of the channel identifications 680a-680p. Scan table entry 678a is associated with channel identification 680a, scan table entry 678b is associated with channel identification 680b, and scan table entry 678p is associated with channel identification 680p. Channel identifications 680a-680p identify channels on the synchronous TDM network. In addition, channel identifications 680a-680p can be no operation entries. A pointer into TX scan table 2 at 628 points to one of the scan table entries 678a-678p and to the corresponding one of the channel identifications 680a-680p.

Scan table 2 scheduler 634 includes a polling mechanism that includes a timer, which periodically indicates the end of a timed period. The polling mechanism operates independently of other polling mechanisms in TX manager 600. At the end of the timed period, scan table 2 scheduler 634 increments the pointer into TX scan table 2 at 628. In one embodiment, the pointer is incremented in a round robin scheme from scan table entry 678a to scan table entry 678b and so on, up to scan table entry 678p, and the pointer is incremented from the last scan table entry 678p to the first scan table entry 678a in TX scan table 2 at 628.

The pointer points to one of the scan table entries 678a-678p and the corresponding one of the channel identifications 680a-680p, which is provided to multiplexer 636 and TX forwarding block 610. The TX forwarding block 610 obtains a data segment for the identified channel and assembles the data segment into a data segment packet that is sent to transmit buffer 652 and transmitted over a mate interface, such as mate interface 216 (shown in FIG. 3) or mate interface 248 (shown in FIG. 3). TX forwarding block 610 can obtain idle frames or segments if the corresponding one of the channel identifications 680a-680p is a no operation entry. In one embodiment, the corresponding one of the channel identifications 680a-680p is provided to either the TX forwarding block 610 to transmit data from transmit buffer 652 over a mate interface or to a transmit buffer to transmit data through an SPI interface, such as west RMAC SPI 222 (shown in FIG. 3) and east RMAC SPI 254 (shown in FIG. 3). In one embodiment, TX scan table 2 at 628 and scan table 2 scheduler 634 operate at the equivalent of the VT1.5/TU-11 data rate.

Buffer status processor 638 obtains receive buffer status signals of normal or satisfy from the RX manager, such as RX manager 220 (shown in FIG. 3) and RX manager 252 (shown in FIG. 3). Buffer status processor 638 and scan table 2 scheduler 634 flag channels that have a receive buffer status of satisfy and prevent channel identifications 680a-680p of the flagged channels from being sent to multiplexer 636 and TX forwarding block 610.

In one embodiment, TX scan table 2 at 628 and scan table 2 scheduler 634 operate in the 10 Giga bit per second (Gbps) mode. In this mode, n equals 5376 and TX scan table 2 at 628 includes 5376 scan table entries 678a-678p and 5376 corresponding channel identifications 680a-680p. Also, scan table 2 scheduler 634 indicates the end of a timed period every 13.77865 nanoseconds. A different one of the scan table entries 678a-678p is selected every 13.77865 nanoseconds and each of the scan table entries 678a-678p is selected about once every 74.07 microseconds. If a 16 byte segment for a channel is transmitted every 74.07 microseconds, the data rate for the channel is about 1.728 Mbps. Other data rates can be obtained by having multiple entries of the same channel in channel identifications 680a-680p. For example, if TX scan table 2 at 628 includes three entries for one channel in channel identifications 680a-680p, the data rate is about 5.18 Mbps for the channel.

In one embodiment, TX scan table 2 at 628 and scan table 2 scheduler 634 operate in the 2.5 Gbps mode. In this mode, n equals 1344 and TX scan table 2 at 628 includes 1344 scan table entries 678a-678p and 1344 channel identifications 680a-680p. Scan table 2 scheduler 634 indicates the end of a timed period of 55.11464 nanoseconds. A different one of the scan table entries 678a-678p is selected every 55.11464 nanoseconds and each of the scan table entries 678a-678p is selected about once every 74.07 microseconds. If a 16 byte segment for a channel is transmitted every 74.07 microseconds, the data rate for the channel is about 1.728 Mbps. Other data rates can be obtained by having multiple entries of the same channel in channel identifications 680a-680p.

Transmit buffer 652 stores segment status packets 682a-682s and data segment packets 684a-684s. Each of the segment status packets 682a-682s is similar to segment status packet 500 of FIG. 6 and each of the data segment packets 684a-684s is similar to segment packet 300 of FIG. 4. Also, each of the segment status packets 682a-682s corresponds to one of the segment packets 684a-684s. Segment status packet 682a corresponds to segment packet 684a, segment status packet 682b corresponds to segment packet 684b, and on, up to segment status packet 682s that corresponds to segment packet 684s. Transmit buffer 652 receives segment status packets 682a-682s and segment packets 684a-684s from TX forwarding block 610 and transmits segment status packets 682a-682s and data segment packets 684a-684s over a mate interface, such as mate interface 216 (shown in FIG. 3) or mate interface 248 (shown in FIG. 3). Segment status packets 682a-682s are transmitted to a status interface, such as status interface 232 (shown in FIG. 3) and status interface 264 (shown in FIG. 3). Segment packets 684a-684s are transmitted to an RS, such as RS 226 (shown in FIG. 3) and RS 258 (Shown in FIG. 3).

In operation, TX manager 600 receives data packets in asynchronous packet communication from network elements and stores the data in network element queue 602. Also, TX manager 600 receives data packets in asynchronous packet communication from the physical layer, which receives the data from the synchronous TDM network, and stores the data in transit queue 604. In addition, generated frame queue 606 stores data generated to control communications on the mate interface and the synchronous TDM network, and idle frame and bandwidth generator 608 generates frames and reserves bandwidth on the mate interface and the synchronous TDM network.

Scan table 0 scheduler 630, scan table 1 scheduler 632, and scan table 2 scheduler 634 operate independently of one another to select channel identifications from TX scan table 0 at 624, TX scan table 1 at 626, and TX scan table 2 at 628. Scan table 0 scheduler 630 polls TX scan table 0 at 624 to increment the pointer into TX scan table 0 at 624 and select one of the scan table entries 670a-670n and one of the channel identifications 672a-672n. Scan table 1 scheduler 632 polls TX scan table 1 at 626 to increment the pointer into TX scan table 1 at 626 and select one of the scan table entries 674a-674m and one of the channel identifications 676a-676m. Scan table 2 scheduler 634 polls TX scan table 2 at 628 to increment the pointer into TX scan table 2 at 628 and select one of the scan table entries 678a-678p and one of the channel identifications 680a-680p. Each of the scan table schedulers 630, 632, and 634 filter selected channel identifications 672a-672n, 676a-676m, and 680a-680p to remove channel identifications that have been flagged due to a receive buffer status of satisfy. Channel identifications 672a-672n, 676a-676m, and 680a-680p that have not been flagged are provided to multiplexer 636 and TX forwarding block 610.

TX forwarding block 610 selects a data segment from each of the channels identified by the provided channel identifications 672a-672n, 676a-676m, and 680a-680p and assembles the selected data segments into data segment packets that are transmitted to transmit buffer 652. Also, TX forwarding block 610 assembles segment information into segment status packets that are transmitted to transmit buffer 652. The transmit buffer 652 transmits each of the segment status packets 682a-682s and corresponding segment packets 684a-684s to the mate interface and another RMAC device.

In one embodiment, scan table 0 scheduler 630, scan table 1 scheduler 632, and scan table 2 scheduler 634 select channel identifications 672a-672n, 676a-676m, and 680a-680p that identify channels and no operation entries to select each of the channels on the synchronous TDM network at a data rate that corresponds to the data rate of each of the identified channels on the synchronous TDM network. Channel identifications 672a-672n, 676a-676m, and 680a-680p can identify a channel once or more than once to achieve the data rate of the channel on the synchronous TDM network. In one embodiment, scan table 0 scheduler 630, scan table 1 scheduler 632, and scan table 2 scheduler 634 select channel identifications 672a-672n, 676a-676m, and 680a-680p that identify channels on the synchronous TDM network and no operation entries at a combined data rate that corresponds to the synchronous TDM network data rate, such as 2.5 Gbps or 10 Gbps.

Figure 8:
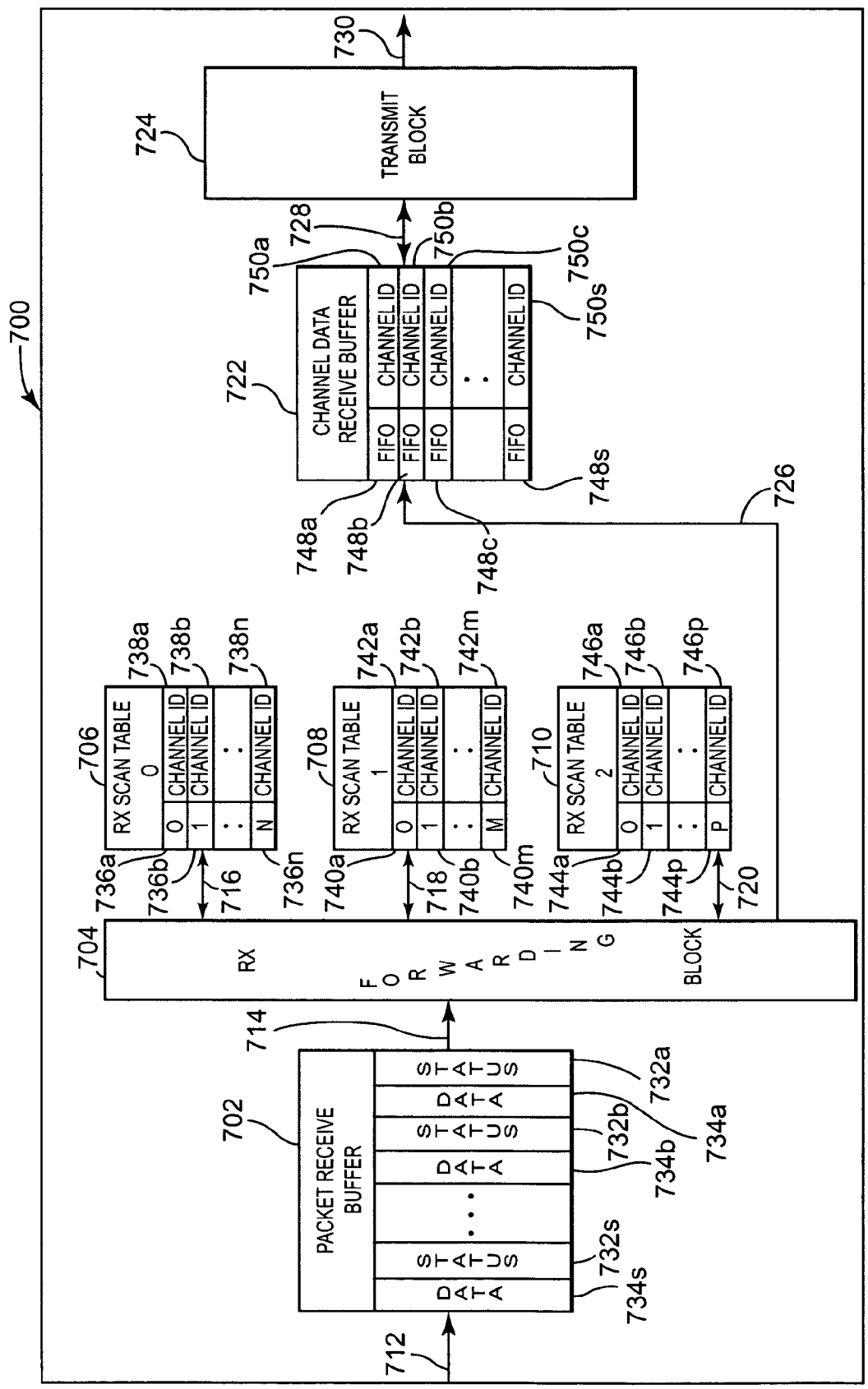
FIG. 8 is a diagram illustrating one embodiment of a receive (RX) manager.

FIG. 8 is a diagram illustrating one embodiment of an RX manager 700. RX manger 700 is similar to RX manager 220 (shown in FIG. 3) and RX manager 252 (shown in FIG. 3). RX manager 700 is part of a MAC layer that receives data packets via asynchronous packet communication in a mate interface, such as mate interface 216 (shown in FIG. 3) and mate interface 248 (shown in FIG. 3). RX manager 700 assembles data for a channel and stores the data in a memory location for the channel. Also, RX manager 700 transmits the data to an SPI interface, such as west RMAC SPI 222 (shown in FIG. 3) and east RMAC SPI 254 (shown in FIG. 3). In addition, RX manager 700 regulates the data rate for each channel on the synchronous TDM network. In one embodiment, RX manager 700 transmits data for a channel at essentially the data rate of the channel on the synchronous TDM network.

RX manager 700 includes a packet receive buffer 702, an RX forwarding block 704, RX scan table 0 at 706, RX scan table 1 at 708, and RX scan table 2 at 710. The packet receive buffer 702 is communicatively coupled to receive data from the mate interface via RX communications path 712. Also, packet receive buffer 702 is communicatively coupled to RX forwarding block 704 via buffer communications path 714. The RX forwarding block 704 is communicatively coupled to RX scan table 0 at 706 via pointer communications path 716, and to RX scan table 1 at 708 via pointer communications path 718, and to RX scan table 2 at 710 via pointer communications path 720.

Also, RX manager 700 includes a channel data receive buffer 722 and a transmit block 724. RX forwarding block 704 is communicatively coupled to channel data receive buffer 722 via forwarding block communications path 726 and channel data receive buffer 722 is communicatively coupled to transmit block 724 via receive buffer communications path 728. Transmit block 724 transmits the data to an SPI interface via RX communications path 730. The SPI interface transmits the data to a physical layer, which transmits the data to the synchronous TDM network.

Packet receive buffer 702 receives segment status packets 732a-732s and data segment packets 734a-734s via RX communications path 712 from the mate interface. Each of the segment status packets 732a-732s is similar to segment status packet 500 of FIG. 6 and each of the data segment packets 734a-734s is similar to segment packet 300 of FIG. 4. Also, each of the segment status packets 732a-732s corresponds to one of the segment packets 734a-734s. Segment status packet 732a corresponds to segment packet 734a, segment status packet 732b corresponds to segment packet 734b, and on, up to segment status packet 732s that corresponds to segment packet 734s. Packet receive buffer 702 transmits segment status packets 732a-732s and segment packets 734a-734s to RX forwarding block 704.

RX forwarding block 704 obtains segment status packets 732a-732s and segment packets 734a-734s from packet receive buffer 702. RX forwarding block 704 reassembles data for a channel from segment packets 734a-734s and provides the reassembled data to channel data receive buffer 722. The reassembled data for a channel is stored in a memory area for the channel in channel data receive buffer 722.

To reassemble data for a channel from segment packets 734a-734s, RX forwarding block 704 obtains the scan table identification from each scan table identification field, such as scan table identification field 512 (shown in FIG. 6), in segment status packets 732a-732s. The scan table identification for a segment indicates the receive scan table that includes the channel identification for the segment. RX forwarding block 704 obtains the channel identification for the segment from the indicated scan table and reassembles the data into channel data. The reassembled channel data is provided to channel data receive buffer 722.

RX scan table 0 at 706 includes scan table entries 736a-736n and channel identifications 738a-738n. Each of the scan table entries 736a-736n is associated with one of the channel identifications 738a-738n. Scan table entry 736a is associated with channel identification 738a, scan table entry 736b is associated with channel identification 738b, and scan table entry 736n is associated with channel identification 738n. Channel identifications 738a-738n identify channels for data on the synchronous TDM network. In addition, channel identifications 738a-738n can be no operation entries. A pointer into RX scan table 0 at 706 points to one of the scan table entries 736a-736n and to the corresponding one of the channel identifications 738a-738n.

RX forwarding block 704 obtains the scan table identification for a data segment from one of the segment status packets 732a-732s. If the scan table identification indicates scan table 0 at 706, RX forwarding block 704 increments the pointer into RX scan table 0 at 706 and retrieves the one of the channel identifications 738a-738n pointed to by the pointer. RX forwarding block 704 provides the data segment to channel data receive buffer 722 and the data segment is stored in the memory for the channel identified by the retrieved one of the channel identifications 738a-738n. Nothing is sent to channel data receive buffer 722 if the retrieved one of the channel identifications 738a-738n is a no operation entry. In one embodiment, the pointer is incremented in a round robin scheme from scan table entry 736a to scan table entry 736b and so on, up to scan table entry 736n, and the pointer is incremented from the last scan table entry 736n to the first scan table entry 736a.

In one embodiment, RX scan table 0 at 706 corresponds to TX scan table 0 at 624 (shown in FIG. 7). The channels identified in channel identifications 738a-738n are in the same sequence in channel identifications 738a-738n and channel identifications 672a-672n (shown in FIG. 7). Channel identifications 672a-672n can also include channel identities that are not in channel identifications 738a-738n. TX forwarding block 610 (shown in FIG. 7) assembles data segments for channels identified by channel identifications 672*a*-672*n* into segment packets. For data segments having channel identifications in TX scan table 0 at 624 and RX scan table 0 at 706, TX forwarding block 610 includes a scan table 0 identification in the scan table identification field of the segment status packet. RX forwarding block 704 receives the segment packets and segment status packets and for each of the scan table 0 identifications, RX forwarding block 704 increments the pointer into RX scan table 0 at 706 and retrieves the one of the channel identifications 738*a*-738*n* pointed to by the pointer. The data segment corresponding to the scan table 0 identification is stored in the memory area in channel data receive buffer 722 for the identified channel.

To synchronize the pointer into RX scan table 0 at 706 with the pointer into TX scan table 0 at 624, TX forwarding block 610 includes a scan table synchronization byte that indicates RX scan table 0 in the status control field of the segment packet, such as status control field 304 in segment packet 300 of FIG. 4. The RX scan table 0 synchronization byte indicates that the first data segment in the first timeslot of the payload in the segment packet corresponds to the first channel identification entry 738*a* in RX scan table 0 at 706. This first channel identification entry 738*a* is the first channel identification entry in the sequence of channel identification entries in channel identifications 738*a*-738*n* that corresponds to the same sequence of channel identification entries in channel identifications 672*a*-672*n*. RX forwarding block 704 receives each of the data segment packets 734*a*-734*s* and obtains the scan table synchronization bytes for RX scan table 0 at 706 to synchronize the pointer into RX scan table 0 at 706 with the pointer into TX scan table 0 at 624.

In one embodiment, RX scan table 0 at 706 and TX scan table 0 at 624 operate at the equivalent of the STS-1/VC-3 data rate. In one embodiment, RX scan table 0 at 706 and TX scan table 0 at 624 operate in the 10 Giga bit per second (Gbps) mode previously described. In one embodiment, RX scan table 0 at 706 and TX scan table 0 at 624 operate in the 2.5 Gbps mode previously described.

RX scan table 1 at 708 includes scan table entries 740*a*-740*m* and channel identifications 742*a*-742*m*. Each of the scan table entries 740*a*-740*m* is associated with one of the channel identifications 742*a*-742*m*. Scan table entry 740*a* is associated with channel identification 742*a*, scan table entry 740*b* is associated with channel identification 742*b*, and scan table entry 740*m* is associated with channel identification 742*m*. Channel identifications 742*a*-742*m* identify channels for data on the synchronous TDM network. In addition, channel identifications 742*a*-742*m* can be no operation entries. A pointer into RX scan table 1 at 708 points to one of the scan table entries 740*a*-740*m* and to the corresponding one of the channel identifications 742*a*-742*m*.

RX forwarding block 704 obtains the scan table identification for a data segment from one of the segment status packets 732*a*-732*s*. If the scan table identification indicates scan table 1 at 708, RX forwarding block 704 increments the pointer into RX scan table 1 at 708 and retrieves the one of the channel identifications 742*a*-742*m* pointed to by the pointer. RX forwarding block 704 provides the data segment to channel data receive buffer 722 and the data segment is stored in the memory for the channel identified by the retrieved one of the channel identifications 742*a*-742*m*. Nothing is sent to channel data receive buffer 722 if the retrieved one of the channel identifications 742*a*-742*m* is a no operation entry. In one embodiment, the pointer is incremented in a round robin scheme from scan table entry 740*a* to scan table entry 740*b* and so on, up to scan table entry 740*m*, and the pointer is incremented from the last scan table entry 740*m* to the first scan table entry 740*a*.

In one embodiment, RX scan table 1 at 708 corresponds to TX scan table 1 at 626 (shown in FIG. 7). The channels identified in channel identifications 742*a*-742*m* are in the same sequence in channel identifications 742*a*-742*m* and channel identifications 676*a*-676*m* (shown in FIG. 7). Channel identifications 676*a*-676*m* can also include channel identities that are not in channel identifications 742*a*-742*m*. TX forwarding block 610 (shown in FIG. 7) assembles data segments for channels identified by channel identifications 676*a*-676*m* into segment packets. For data segments having channel identifications in TX scan table 1 at 626 and RX scan table 1 at 708, TX forwarding block 610 includes a scan table 1 identification in the scan table identification field of the segment status packet. RX forwarding block 704 receives the segment packets and segment status packets and for each of the scan table 1 identifications, RX forwarding block 704 increments the pointer into RX scan table 1 at 708 and retrieves the one of the channel identifications 742*a*-742*m* pointed to by the pointer. The data segment corresponding to the scan table 1 identification is stored in the memory area in channel data receive buffer 722 for the identified channel.

To synchronize the pointer into RX scan table 1 at 708 with the pointer into TX scan table 1 at 626, TX forwarding block 610 includes a scan table synchronization byte that indicates RX scan table 1 in the status control field of the segment packet, such as status control field 304 in segment packet 300 of FIG. 4. The RX scan table 1 synchronization byte indicates that the first data segment in the first timeslot of the payload in the segment packet corresponds to the first channel identification entry 742*a* in RX scan table 1 at 708. This first channel identification entry 742*a* is the first channel identification entry in the sequence of channel identification entries in channel identifications 742*a*-742*m* that corresponds to the same sequence of channel identification entries in channel identifications 676*a*-676*m*. RX forwarding block 704 receives each of the data segment packets 734*a*-734*s* and obtains the scan table synchronization bytes for RX scan table 1 at 708 to synchronize the pointer into RX scan table 1 at 708 with the pointer into TX scan table 1 at 626.

In one embodiment, RX scan table 1 at 708 and TX scan table 1 at 626 operate at the equivalent of the STS-1/VC-3 data rate. In one embodiment, RX scan table 1 at 708 and TX scan table 1 at 626 operate in the 10 Giga bit per second (Gbps) mode previously described. In one embodiment, RX scan table 1 at 708 and TX scan table 1 at 626 operate in the 2.5 Gbps mode previously described.

RX scan table 2 at 710 includes scan table entries 744*a*-744*p* and channel identifications 746*a*-746*p*. Each of the scan table entries 744*a*-744*p* is associated with one of the channel identifications 746*a*-746*p*. Scan table entry 744*a* is associated with channel identification 746*a*, scan table entry 744*b* is associated with channel identification 746*b*, and scan table entry 744*p* is associated with channel identification 746*p*. Channel identifications 746*a*-746*p* identify channels for data on the synchronous TDM network. In addition, channel identifications 746*a*-746*p* can be no operation entries. A pointer into RX scan table 2 at 710 points to one of the scan table entries 744*a*-744*p* and to the corresponding one of the channel identifications 746*a*-746*p*.

RX forwarding block 704 obtains the scan table identification for a data segment from one of the segment status packets 732*a*-732*s*. If the scan table identification indicates scan table 2 at 710, RX forwarding block 704 increments the pointer into RX scan table 2 at 710 and retrieves the one of the channel identifications 746a-746p pointed to by the pointer. RX forwarding block 704 provides the data segment to channel data receive buffer 722 and the data segment is stored in the memory for the channel identified by the retrieved one of the channel identifications 746a-746p. Nothing is sent to channel data receive buffer 722 if the retrieved one of the channel identifications 746a-746p is a no operation entry. In one embodiment, the pointer is incremented in a round robin scheme from scan table entry 744a to scan table entry 744b and so on, up to scan table entry 744p, and the pointer is incremented from the last scan table entry 744p to the first scan table entry 744a.

In one embodiment, RX scan table 2 at 710 corresponds to TX scan table 2 at 628 (shown in FIG. 7). The channels identified in channel identifications 746a-746p are in the same sequence in channel identifications 746a-746p and channel identifications 680a-680p (shown in FIG. 7). Channel identifications 680a-680p can also include channel identities that are not in channel identifications 746a-746p. TX forwarding block 610 (shown in FIG. 7) assembles data segments for channels identified by channel identifications 680a-680p into segment packets. For data segments having channel identifications in TX scan table 2 at 628 and RX scan table 2 at 710, TX forwarding block 610 includes a scan table 2 identification in the scan table identification field of the segment status packet. RX forwarding block 704 receives the segment packets and segment status packets and for each of the scan table 2 identifications, RX forwarding block 704 increments the pointer into RX scan table 2 at 710 and retrieves the one of the channel identifications 746a-746p pointed to by the pointer. The data segment corresponding to the scan table 2 identification is stored in the memory area in channel data receive buffer 722 for the identified channel.

To synchronize the pointer into RX scan table 2 at 710 with the pointer into TX scan table 2 at 628, TX forwarding block 610 includes a scan table synchronization byte that indicates RX scan table 2 in the status control field of the segment packet, such as status control field 304 in segment packet 300 of FIG. 4. The RX scan table 2 synchronization byte indicates that the first data segment in the first timeslot of the payload in the segment packet corresponds to the first channel identification entry 746a in RX scan table 2 at 710. This first channel identification entry 746a is the first channel identification entry in the sequence of channel identification entries in channel identifications 746a-746p that corresponds to the same sequence of channel identification entries in channel identifications 680a-680p. RX forwarding block 704 receives each of the data segment packets 734a-734s and obtains the scan table synchronization bytes for RX scan table 2 at 710 to synchronize the pointer into RX scan table 2 at 710 with the pointer into TX scan table 2 at 628.

In one embodiment, RX scan table 2 at 710 and TX scan table 2 at 628 operate at the equivalent of the STS-1/VC-3 data rate. In one embodiment, RX scan table 2 at 710 and TX scan table 2 at 628 operate in the 10 Giga bit per second (Gbps) mode previously described. In one embodiment, RX scan table 2 at 710 and TX scan table 2 at 628 operate in the 2.5 Gbps mode previously described.

Channel data receive buffer 722 includes FIFO memories 748a-748s associated with channel identifications 750a-750s. Each of the FIFO memories 748a-748s is associated with one of the channel identifications 750a-750s. FIFO memory 748a is associated with channel identification 750a, FIFO memory 748b is associated with channel identification 750b, FIFO memory 748c is associated with channel identification 750c, and so on, up to FIFO memory 748s being associated with channel identification 750s. Each of the FIFO memories 748a-748s stores data for the channel identified by the corresponding one of the channel identifications 750a-750s. Channel identifications 750a-750s identify channels on the synchronous TDM network. Channel data receive buffer 722 provides the data in channel identifications 750a-750s to transmit block 724.

Transmit block 724 obtains data from channel data receive buffer 722 and transmits the data to an SPI, such as west RMAC SPI 222 (shown in FIG. 3) and east RMAC SPI 254 (shown in FIG. 3). The SPI provides the data to a physical layer that transmits the data on the synchronous TDM network. In one embodiment, transmit block 724 transmits data from a channel in channel identifications 750a-750s to the SPI and synchronous TDM network at the data rate of the identified channel on the synchronous TDN network.

In operation, packet receive buffer 702 receives segment status packets 732a-732s and data segment packets 734a-734s via RX communications path 712 from a mate interface. RX forwarding block 704 receives the segment status packets 732a-732s and data segment packets 734a-734s from packet receive buffer 702 and reassembles the data for a channel from segment packets 734a-734s. To reassemble the data for a channel, RX forwarding block 704 obtains each of the scan table identifications for each of the segments in one of the segment packets 734a-734s from the corresponding one of the segment status packets 732a-732s. TX forwarding block 704 increments the pointer into one of the RX scan tables 706, 708, or 710 based on the scan table identification for a data segment and obtains the channel identification for the data segment. RX forwarding block 704 forwards the data segment to the channel receive buffer 722 and stores the data segment in the one of the FIFO's 748a-748s that corresponds to the one of the channel identifications 750a-750s for the identified channel. Transmit block 724 obtains data from channel data receive buffer 722 and transmits the data to an SPI and the synchronous TDM network.

Figure 9:
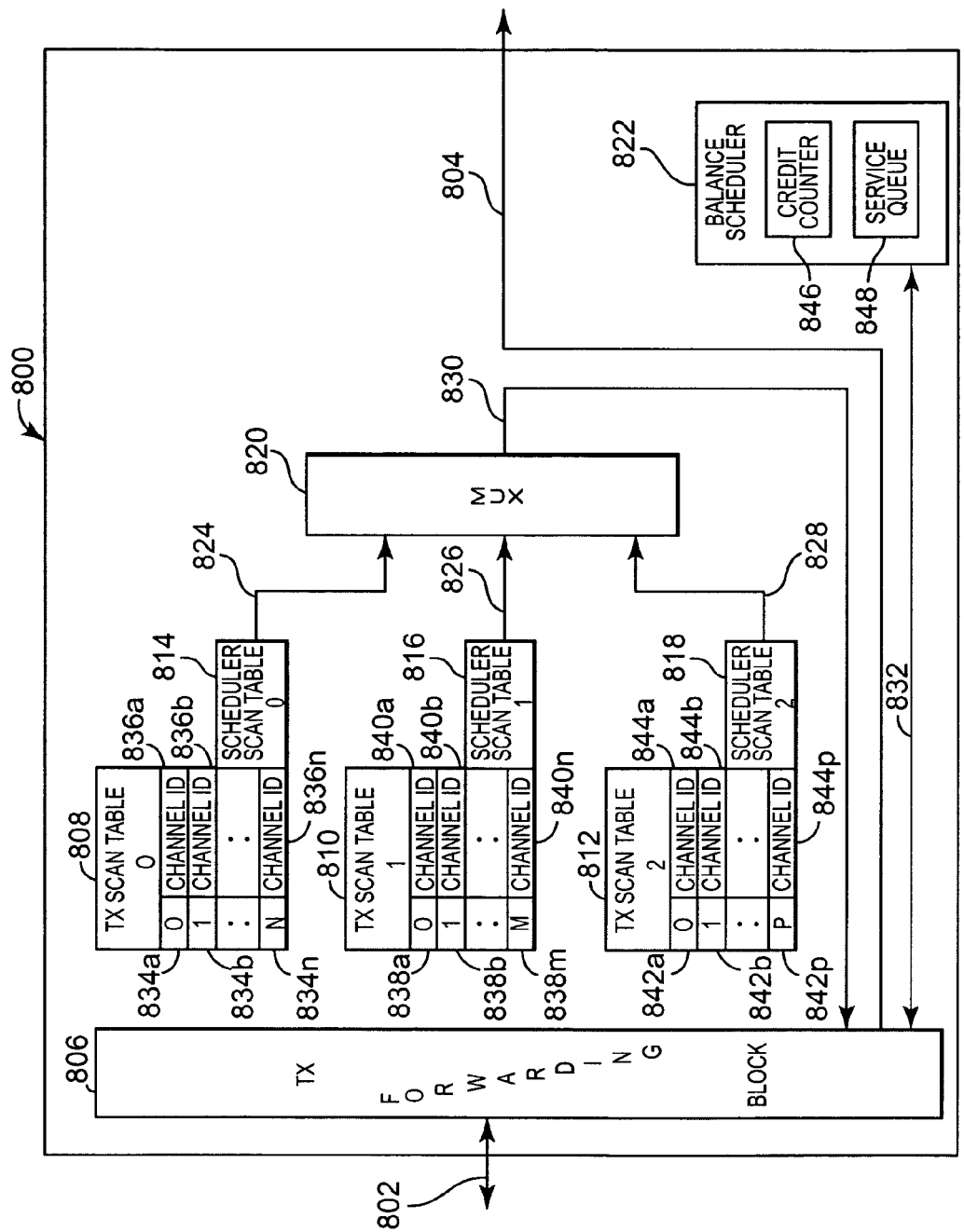
FIG. 9 is a diagram illustrating one embodiment of a transmit block.

FIG. 9 is a diagram illustrating one embodiment of a transmit block 800. An RX manager, such as RX manager 700 of FIG. 8, includes transmit block 800 that is similar to transmit block 724 (shown in FIG. 8). Transmit block 800 is communicatively coupled to a channel data receive buffer, such as channel data receive buffer 722 (shown in FIG. 8), via receive buffer communications path 802. Also, transmit block 800 is communicatively coupled to an SPI, such as west RMAC SPI 222 (shown in FIG. 3) or east RMAC SPI 254 (shown in FIG. 3), via RX communications path 804.

Transmit block 800 obtains data from the channel data receive buffer and transmits the data to the SPI, which provides the data to a physical layer that transmits the data on the synchronous TDM network. In one embodiment, transmit block 800 transmits data for a channel to the SPI and synchronous TDM network at the data rate of the channel on the synchronous TDN network.

Transmit block 800 includes TX forwarding block 806, TX scan table 0 at 808, TX scan table 1 at 810, TX scan table 2 at 812, scan table 0 scheduler 814, scan table 1 scheduler 816, scan table 2 scheduler 818, a multiplexer 820, and a balance scheduler 822. Each of the TX scan tables 808, 810, and 812 is communicatively coupled to one of the scan table schedulers 814, 816, and 818. TX scan table 0 at 808 is communicatively coupled to scan table 0 scheduler 814, TX scan table 1 at 810 is communicatively coupled to scan table 1 scheduler 816, and TX scan table 2 at 812 is communicatively coupled to scan table 2 scheduler 818.

Also, scan table 0 scheduler 814 is communicatively coupled to multiplexer 820 via scheduler communications path 824. Scan table 1 scheduler 816 is communicatively coupled to multiplexer 820 via scheduler communications path 826. Scan table 2 scheduler 818 is communicatively coupled to multiplexer 820 via scheduler communications path 828. Multiplexer 820 is communicatively coupled to TX forwarding block 806 via multiplexer communications path 830. In addition, TX forwarding block 806 is communicatively coupled to the SPI via RX communications path 804 and to balance scheduler 822 via balance scheduler communications path 832.

TX scan table 0 at 808 is communicatively coupled to scan table 0 scheduler 814 and includes scan table entries 834a-834n and channel identifications 836a-836n. Each of the scan table entries 834a-834n is associated with one of the channel identifications 836a-836n. Scan table entry 834a is associated with channel identification 836a, scan table entry 834b is associated with channel identification 836b, and so on, up to scan table entry 834n is associated with channel identification 836n. Channel identifications 836a-836n identify channels on the synchronous TDM network. In addition, channel identifications 836a-836n can be no operation entries. A pointer into TX scan table 0 at 808 points to one of the scan table entries 834a-834n and to the corresponding one of the channel identifications 836a-836n.

Scan table 0 scheduler 814 includes a polling mechanism that includes a timer, which periodically indicates the end of a timed period. The polling mechanism operates independently of other polling mechanisms in transmit block 800. At the end of the timed period, scan table 0 scheduler 814 increments the pointer into TX scan table 0 at 808. In one embodiment, the pointer is incremented in a round robin scheme from scan table entry 834a to scan table entry 834b and so on, up to scan table entry 834n, and the pointer is incremented from the last scan table entry 834n to the first scan table entry 834a in TX scan table 0 at 808.

The pointer points to one of the scan table entries 834a-834n and the corresponding one of the channel identifications 836a-836n, which is provided to multiplexer 820 and TX forwarding block 806. The TX forwarding block 806 obtains data for the identified channel from the channel data receive buffer via receive buffer communications path 802 and assembles the data into an SPI frame that is transmitted to the SPI via RX communications path 804. TX forwarding block 806 can obtain idle frames or segments if the corresponding one of the channel identifications 836a-836n is a no operation entry. In one embodiment, TX scan table 0 at 808 and scan table 0 scheduler 814 operate at the equivalent of the STS-1/VC-3 data rate.

In one embodiment, TX scan table 0 at 808 and scan table 0 scheduler 814 operate in the 10 Giga bit per second (Gbps) mode. In this mode, n equals 192 and TX scan table 0 at 808 includes 192 scan table entries 834a-834n and 192 corresponding channel identifications 836a-836n. Also, scan table 0 scheduler 814 indicates the end of a timed period every 13.30353 nanoseconds. A different one of the scan table entries 834a-834n is selected every 13.30353 nanoseconds and each of the scan table entries 834a-834n is selected about once every 2.55 microseconds. If a 16 byte segment for a channel is transmitted every 2.55 microseconds, the data rate for the channel is about 50 mega bits per second (Mbps). Other data rates can be obtained by having multiple entries of the same channel in channel identifications 836a-836n. For example, if TX scan table 0 at 808 includes three entries for one channel in channel identifications 836a-836n, the data rate is about 150 Mbps for the channel.

In one embodiment, TX scan table 0 at 808 and scan table 0 scheduler 814 operate in the 2.5 Gbps mode. In this mode, n equals 48 and TX scan table 0 at 808 includes 48 scan table entries 834a-834n and 48 channel identifications 836a-836n. Scan table 0 scheduler 814 indicates the end of a timed period of 53.21413 nanoseconds. A different one of the scan table entries 834a-834n is selected every 53.21413 nanoseconds and each of the scan table entries 834a-834n is selected about once every 2.55 microseconds. If a 16 byte segment for a channel is transmitted every 2.55 microseconds, the data rate for the channel is about 50 Mbps. Other data rates can be obtained by having multiple entries of the same channel in channel identifications 836a-836n. For example, if TX scan table 0 at 808 includes three entries for one channel in channel identifications 836a-836n, the data rate is about 150 Mbps for the channel.

TX scan table 1 at 810 is communicatively coupled to scan table 1 scheduler 816 and includes scan table entries 838a-838m and channel identifications 840a-840m. Each of the scan table entries 838a-838m is associated with one of the channel identifications 840a-840m. Scan table entry 838a is associated with channel identification 840a, scan table entry 838b is associated with channel identification 840b, and so on, up to scan table entry 838m is associated with channel identification 840m. Channel identifications 840a-840m identify channels on the synchronous TDM network. In addition, channel identifications 840a-840m can be no operation entries. A pointer into TX scan table 1 at 810 points to one of the scan table entries 838a-838m and to the corresponding one of the channel identifications 840a-840m.

Scan table 1 scheduler 816 includes a polling mechanism that includes a timer, which periodically indicates the end of a timed period. The polling mechanism operates independently of other polling mechanisms in transmit block 800. At the end of the timed period, scan table 1 scheduler 816 increments the pointer into TX scan table 1 at 810. In one embodiment, the pointer is incremented in a round robin scheme from scan table entry 838a to scan table entry 838b and so on, up to scan table entry 838m, and the pointer is incremented from the last scan table entry 838m to the first scan table entry 838a in TX scan table 1 at 810.

The pointer points to one of the scan table entries 838a-838m and the corresponding one of the channel identifications 840a-840m, which is provided to multiplexer 820 and TX forwarding block 806. The TX forwarding block 806 obtains data for the identified channel from the channel data receive buffer via receive buffer communications path 802 and assembles the data into an SPI frame that is transmitted to the SPI via RX communications path 804. TX forwarding block 806 can obtain idle frames or segments if the corresponding one of the channel identifications 840a-840m is a no operation entry. In one embodiment, TX scan table 1 at 810 and scan table 1 scheduler 816 operate at the equivalent of the VT2/TU-12 data rate.

In one embodiment, TX scan table 1 at 810 and scan table 1 scheduler 816 operate in the 10 Giga bit per second (Gbps) mode. In this mode, n equals 4032 and TX scan table 1 at 810 includes 4032 scan table entries 838a-838m and 4032 corresponding channel identifications 840a-840m. Also, scan table 1 scheduler 816 indicates the end of a timed period every 13.77865 nanoseconds. A different one of the scan table entries 838a-838m is selected every 13.77865 nanoseconds and each of the scan table entries 838a-838m is selected about once every 55.56 microseconds. If a 16 byte segment for a channel is transmitted every 55.56 microseconds, the data rate for the channel is about 2.304 Mbps. Other data rates can be obtained by having multiple entries of the same channel in channel identifications 840a-840m. For example, if TX scan table 1 at 810 includes three entries for one channel in channel identifications 840a-840m, the data rate is about 6.91 Mbps for the channel.

In one embodiment, TX scan table 1 at 810 and scan table 1 scheduler 816 operate in the 2.5 Gbps mode. In this mode, n equals 1008 and TX scan table 1 at 810 includes 1008 scan table entries 838a-838m and 1008 channel identifications 840a-840m. Scan table 1 scheduler 816 indicates the end of a timed period of 55.11464 nanoseconds. A different one of the scan table entries 838a-838m is selected every 55.11464 nanoseconds and each of the scan table entries 838a-838m is selected about once every 55.56 microseconds. If a 16 byte segment for a channel is transmitted every 55.56 microseconds, the data rate for the channel is about 2.304 Mbps. Other data rates can be obtained by having multiple entries of the same channel in channel identifications 840a-840m.

TX scan table 2 at 812 is communicatively coupled to scan table 2 scheduler 818 and includes scan table entries 842a-842p and channel identifications 844a-844p. Each of the scan table entries 842a-842p is associated with one of the channel identifications 844a-844p. Scan table entry 842a is associated with channel identification 844a, scan table entry 842b is associated with channel identification 844b, and so on, up to scan table entry 842p is associated with channel identification 844p. Channel identifications 844a-844p identify channels on the synchronous TDM network. In addition, channel identifications 844a-844p can be no operation entries. A pointer into TX scan table 2 at 812 points to one of the scan table entries 842a-842p and to the corresponding one of the channel identifications 844a-844p.

Scan table 2 scheduler 818 includes a polling mechanism that includes a timer, which periodically indicates the end of a timed period. The polling mechanism operates independently of other polling mechanisms in transmit block 800. At the end of the timed period, scan table 2 scheduler 818 increments the pointer into TX scan table 2 at 812. In one embodiment, the pointer is incremented in a round robin scheme from scan table entry 842a to scan table entry 842b and so on, up to scan table entry 842p, and the pointer is incremented from the last scan table entry 842p to the first scan table entry 842a in TX scan table 2 at 812.

The pointer points to one of the scan table entries 842a-842p and the corresponding one of the channel identifications 844a-844p, which is provided to multiplexer 820 and TX forwarding block 806. The TX forwarding block 806 obtains data for the identified channel from the channel data receive buffer via receive buffer communications path 802 and assembles the data into an SPI frame that is transmitted to the SPI via RX communications path 804. TX forwarding block 806 can obtain idle frames or segments if the corresponding one of the channel identifications 844a-844p is a no operation entry. In one embodiment, TX scan table 2 at 812 and scan table 2 scheduler 818 operate at the equivalent of the VT1.5/TU-11 data rate.

In one embodiment, TX scan table 2 at 812 and scan table 2 scheduler 818 operate in the 10 Giga bit per second (Gbps) mode. In this mode, n equals 5376 and TX scan table 2 at 812 includes 5376 scan table entries 842a-842p and 5376 corresponding channel identifications 844a-844p. Also, scan table 2 scheduler 818 indicates the end of a timed period every 13.77865 nanoseconds. A different one of the scan table entries 842a-842p is selected every 13.77865 nanoseconds and each of the scan table entries 842a-842p is selected about once every 74.07 microseconds. If a 16 byte segment for a channel is transmitted every 74.07 microseconds, the data rate for the channel is about 1.728 Mbps. Other data rates can be obtained by having multiple entries of the same channel in channel identifications 844a-844p. For example, if TX scan table 2 at 812 includes three entries for one channel in channel identifications 844a-844p, the data rate is about 5.18 Mbps for the channel.

In one embodiment, TX scan table 2 at 812 and scan table 2 scheduler 818 operate in the 2.5 Gbps mode. In this mode, n equals 1344 and TX scan table 2 at 812 includes 1344 scan table entries 842a-842p and 1344 channel identifications 844a-844p. Scan table 2 scheduler 818 indicates the end of a timed period of 55.11464 nanoseconds. A different one of the scan table entries 842a-842p is selected every 55.11464 nanoseconds and each of the scan table entries 842a-842p is selected about once every 74.07 microseconds. If a 16 byte segment for a channel is transmitted every 74.07 microseconds, the data rate for the channel is about 1.728 Mbps. Other data rates can be obtained by having multiple entries of the same channel in channel identifications 844a-844p.

TX forwarding block 806 obtains data from the channel data receive buffer via receive buffer communications path 802 and provides the data to the SPI via RX communications path 804. TX forwarding block 806 receives channel identifications from multiplexer 820 and in response obtains data for the channel indicated by the received channel identifications from the channel data receive buffer. If the data transmitted to the SPI is not a complete SPI frame, TX forwarding block 806 transmits a service time credit count to balance scheduler 822. Also, if the data in a channel FIFO exceeds a predetermined threshold, TX forwarding block 806 transmits the channel identification for the channel to balance scheduler 822. In one embodiment, TX forwarding block 806 obtains the data from the channel data receive buffer and assembles the data for transmission in a 64 byte SPI frame. If the data is less then 64 bytes, the remaining byte count is transmitted to balance scheduler 822 as the service time credit count.

Balance scheduler 822 includes a service time credit counter 846 and a balance service queue 848. Balance scheduler 822 receives the service time credit count, such as the remaining byte count, from TX forwarding block 806 and service time credit counter 846 accumulates a credit count. The credit count is an indication of the time available for transmissions through the SPI and onto the synchronous TDM network. Balance scheduler 822 receives channel identifications of channels to be serviced and balance service queue 848 stores the received channel identifications.

In one embodiment, TX forwarding block 806 periodically retrieves channel identifications to be serviced from balance service queue 848. If the credit count is greater than or equal to a set value, such as 64 bytes, TX forwarding block 806 retrieves data for the channel and transmits the data to the SPI. Service time credit counter 846 subtracts the credit count or number of bytes used for the transmission and TX forwarding block 806 retrieves another channel identification from the balance service queue 848. If the credit count is greater than or equal to the set value, TX forwarding block retrieves data for the channel and transmits the data to the SPI. This continues until the credit count is less than the set value, such as 64 bytes, at which time balance scheduler 822 clears the credit count and TX forwarding block 806 receives channel identifications from multiplexer 820 and obtains data for the channel indicated by the received channel identifications from the channel data receive buffer.

In operation, scan table 0 scheduler 814, scan table 1 scheduler 816, and scan table 2 scheduler 818 operate independently of one another to select channel identifications from TX scan table 0 at 808, TX scan table 1 at 810, and TX scan table 2 at 812. Scan table 0 scheduler 814 polls TX scan table 0 at 808 to increment the pointer into TX scan table 0 at 808 and select one of the scan table entries 834a-834n and one of the channel identifications 836a-836n. Scan table 1 scheduler 816 polls TX scan table 1 at 810 to increment the pointer into TX scan table 1 at 810 and select one of the scan table entries 838a-838m and one of the channel identifications 840a-840m. Scan table 2 scheduler 818 polls TX scan table 2 at 812 to increment the pointer into TX scan table 2 at 812 and select one of the scan table entries 842a-842p and one of the channel identifications 844a-844p.

TX forwarding block 806 obtains data from the channel data receive buffer for each of the channels identified by the provided channel identifications 836a-836n, 840a-840m, and 844a-844p. TX forwarding block 806 transmits data to the SPI for each of the identified channels. If the transmitted data for a channel is not a complete SPI frame, such as 64 bytes, TX forwarding block 806 transmits a service time credit count to balance scheduler 822 and service time credit counter 846 accumulates the credit count. Also, if the data in a channel FIFO exceeds a predetermined threshold, TX forwarding block 806 transmits the channel identification for the channel to balance scheduler 822 and balance service queue 848 stores the received channel identifications.

After a first scan table cycle, such as once through all of the scan table entries in one of the scan tables, TX forwarding block 806 retrieves the first channel identification to be serviced from balance service queue 848. If the credit count is greater than or equal to a set value, such as 64 bytes, TX forwarding block 806 retrieves data for the channel and transmits the data to the SPI. Service time credit counter 846 subtracts the credit count or number of bytes used for the transmission and TX forwarding block 806 retrieves a second channel identification from the balance service queue 848. If the credit count is greater than or equal to the set value, TX forwarding block retrieves data for the channel and transmits the data to the SPI. This continues until the credit count is less than the set value, such as 64 bytes, at which time balance scheduler 822 clears the credit count and TX forwarding block 806 begins another scan table cycle.

In one embodiment, scan table 0 scheduler 814, scan table 1 scheduler 816, and scan table 2 scheduler 818 select channel identifications 836a-836n, 840a-840m, and 844a-844p that identify channels and no operation entries to select each of the channels on the synchronous TDM network at a data rate that corresponds to the data rate of each of the identified channels on the synchronous TDM network. Channel identifications 836a-836n, 840a-840m, and 844a-844p can identify a channel once or more than once to achieve the data rate of the channel on the synchronous TDM network. In one embodiment, scan table 0 scheduler 814, scan table 1 scheduler 816, and scan table 2 scheduler 818 select channel identifications 836a-836n, 840a-840m, and 844a-844p that identify channels on the synchronous TDM network and no operation entries at a combined data rate that corresponds to the synchronous TDM network data rate, such as 2.5 Gbps or 10 Gbps.

Figures 10A, 10B:
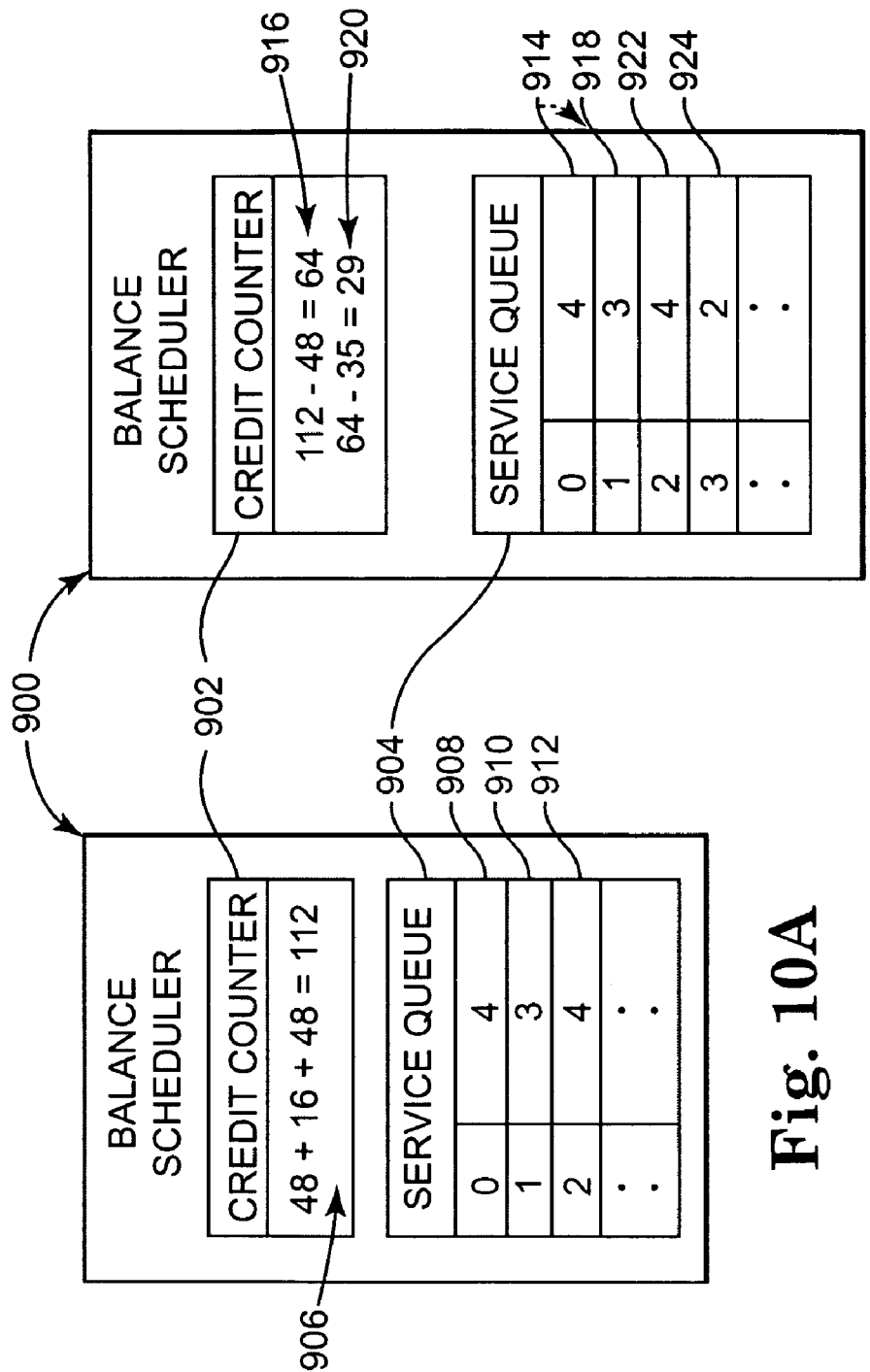
FIG. 10A is a diagram illustrating a balanced scheduler prior to servicing channel identifications in the balanced service queue.
FIG. 10B is a diagram illustrating the balanced scheduler during servicing of channel selections in the balance service queue.

FIGS. 10A and 10B are diagrams illustrating the operation of a balance scheduler 900 that includes a service time credit counter 902 and a balance service queue 904. Balance scheduler 900 is similar to balance scheduler 822 (shown in FIG. 9), where service time credit counter 902 is similar to service time credit counter 846 and balance service queue 904 is similar to balance service queue 848.

During a scan table cycle, such as once through all of the scan table entries in one of the scan tables, the TX forwarding block transmits data to the SPI for each of the identified channels. If the data transmitted for a channel does not constitute a complete SPI frame, such as 64 bytes, the TX forwarding block transmits a service time credit count to balance scheduler 900. Service time credit counter 902 sums the received service time credit counts to obtain a credit count. If the data in a channel's FIFO exceeds a predetermined threshold, the TX forwarding block transmits the channel identification of the channel to balance scheduler 900. Balance service queue 904 stores the received channel identifications.

In this example, during the scan table cycle the TX forwarding block transmits a first 48 byte service time credit count, a 16 byte service time credit count, and a second 48 byte service time credit count, indicated at 906, to balance scheduler 900. Service time credit counter 902 sums the received service time credit counts to get a total credit count of 112 bytes, indicated at 906. Also, the TX forwarding block identifies channel 4 at 908, channel 3 at 910, and channel 4 again at 912 as channels with FIFO's that exceed a predetermined threshold and need servicing.

After the scan table cycle, if the credit count is greater than or equal to a predetermined value, the TX forwarding block services channels in balance service queue 904. In this example, if the credit count is greater than or equal to 64 bytes, the TX forwarding block services a channel from balance service queue 904. The TX forwarding block services channel 4, indicated at 914, and transmits 48 bytes of data for channel 4 to the SPI. Service time credit counter 902 subtracts the 48 bytes from the 112 byte credit count to get a remaining total credit count of 64 bytes at 916. Since the credit count of 64 bytes is still greater than or equal to 64 bytes, the TX forwarding block services channel 3, indicated at 918, and transmits 35 bytes of data for channel 3 to the SPI. Service time credit counter 902 subtracts the 35 bytes from the 64 byte credit count to get a remaining total credit count of 29 bytes at 920. Since the credit count of 29 bytes is less than 64 bytes, the TX forwarding block stops servicing channels from balance service queue 904. The remaining entries in balance service queue 904 of channel 4 at 922 and an additional channel 2 at 924 are cleared from the balance service queue 904. In addition, the credit count is cleared to zero and the TX forwarding block begins another scan table cycle.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A communications system, comprising:
a first stage of a network node including a first scan table; and
a second stage of the network node including a second scan table,
wherein the first stage is configured to select a first channel identification from the first scan table, provide data from a channel identified by the first channel identification, assemble a first packet containing the data and a second packet having status information corresponding to said first packet, and to transmit the first and second packets to the second stage, and
wherein the second stage is configured to receive the first and second packets, divide the first packet into a plurality of data segments based on data length information obtained from the second packet, select a second channel identification from the second scan table for each data segment based on a corresponding identifier obtained from the second packet, and output the data segments on a synchronous network at a data rate corresponding to their respective channel identifications.

2. The communications system of claim 1, wherein the second stage includes a timer associated with the second scan table and configured to periodically initiate a channel identification selection from the second scan table in response to the expiration of a timed period.

3. The communications system of claim 1, wherein the second stage includes a scheduler configured to maintain a credit count that indicates available transmission time.

4. The communications system of claim 3, wherein the scheduler includes a service queue that indicates channels to be serviced and the scheduler is configured to service the channels to be serviced based on the available transmission time.

5. The communications system of claim 1, wherein the first stage is configured to select channel identifications that identify the channel to transmit the data from the channel at approximately the data rate of the channel on the synchronous network.

6. The communications system of claim 1, wherein the first stage includes a timer associated with the first scan table and configured to periodically initiate a channel identification selection from the first scan table in response to the expiration of a timed period.

7. The communications system of claim 1, wherein the second stage includes a third scan table, and the first stage and the second stage are configured to maintain synchronized channel selection between the first scan table and the third scan table.

8. The communications system of claim 1, wherein the second stage includes a third scan table and the second stage is configured to select a scan table entry that identifies the channel from the third scan table.

9. The communications system of claim 1, wherein the second stage is configured to store each data segment into a first-in-first-out memory based on its channel identification.

10. The communications system of claim 1, wherein the second stage is configured to transmit the data segments through a system packet interface to the synchronous network at the data rate of their corresponding channel identifications on the synchronous network.

11. The communications system of claim 1, wherein the synchronous network comprises:
a SONET/SDH ring network.

12. The communications system of claim 1, wherein the first data packet is sent from the first stage to the second stage at a first data rate, and the second data packet is sent from the first stage to the second stage at a second data rate lower than the first data rate.

13. The communications system of claim 1, wherein the first data packet is sent from the first stage to the second stage at a first interface, and the second data packet is sent from the first stage to the second stage at a second interface dedicated to transmitting and receiving status information.

14. A communications system, comprising:
a first system including first scan tables that include first channel entries; and
a second system including second scan tables that include second channel entries, wherein the first system is configured to select a plurality of first channel entries from the first scan tables to provide channel data for each of the selected first channel entries to the second system in one or more segment packets and to provide a status packet corresponding to each of the segment packets, and the second system is configured to receive the segment packet and the status packet, extract the channel data for each channel entry from the segment packet based on first information obtained from the corresponding status packet, and select the second channel entries from the second scan tables based on second information obtained from the corresponding status packet to provide the channel data on a synchronous network based on each of the selected second channel entries.

15. The communications system of claim 14, wherein the first channel entries identify channels and each of the identified channels has a corresponding channel data rate on a synchronous network and the first system is configured to provide channel data from each of the identified channels at the corresponding channel data rate.

16. The communications system of claim 14, wherein the second channel entries identify channels and each of the identified channels has a corresponding channel data rate on a synchronous network and the second system is configured to provide channel data from each of the identified channels at the corresponding channel data rate.

17. The communications system of claim 14, wherein the first system comprises timers and each of the timers is associated with one of the first scan tables and configured to periodically initiate a channel entry selection from the associated one of the first scan tables in response to the expiration of a timed period.

18. The communications system of claim 17, wherein each of the timers is configured to have a different timed period and to initiate the channel entry selection from the associated one of the first scan tables independently of the other timers.

19. The communications system of claim 14, wherein the second system comprises timers and each of the timers is associated with one of the second scan tables and configured to periodically initiate a channel entry selection from the associated one of the second scan tables in response to the expiration of a timed period.

20. The communications system of claim 19, wherein each of the timers is configured to have a different timed period and to initiate the channel entry selection from the associated one of the second scan tables independently of the other timers.

21. The communications system of claim 14, wherein the first channel entries in one of the first scan tables identify one channel multiple times.

22. The communications system of claim 14, wherein one of the first scan tables is configured to identify one channel and another one of the first scan tables is configured to identify the one channel.

23. The communications system of claim 14, wherein the second channel entries in one of the second scan tables identify one channel multiple times.

24. The communications system of claim 14, wherein one of the second scan tables is configured to identify one channel and another one of the second scan tables is configured to identify the one channel.

25. The communications system of claim 14, wherein the second system includes a scheduler configured to maintain a credit count that indicates available transmission time on the synchronous network.

26. The communications system of claim 25, wherein the scheduler includes a service queue that indicates channels to be serviced and the scheduler is configured to service the channels to be serviced based on the available transmission time.

27. The communications system of claim 14, wherein the first data packet is sent from the first stage to the second stage at a first data rate, and the second data packet is sent from the first stage to the second stage at a second data rate lower than the first data rate.

28. The communications system of claim 14, wherein the first data packet is sent from the first stage to the second stage at a first interface, and the second data packet is sent from the first stage to the second stage at a second interface dedicated to transmitting and receiving status information.

29. A communications system, comprising:
   means for scheduling a first channel selection comprising a plurality of channels from a first scan table maintained at a first stage of a network node;
   means for providing data from the channels of the first channel selection in a first packet;
   means for asynchronously transmitting the first packet and a second packet having information for each channel in the first channel selection;
   means for receiving the first packet and the second packet at a second stage of the network node and extracting the received data from the first packet based on first information from the second packet;
   means for scheduling a second channel selection from a second scan table maintained at the second stage based on second information from the second packet; and
   means for providing the received data at a data rate of the selected channel on a synchronous network based on the second channel selection.

30. The communications system of claim 29, wherein the means for scheduling a second channel selection comprises:
   means for timing a timed period;
   means for periodically initiating the second channel selection from the second scan table based on the periodic expiration of the timed period;
   means for maintaining a credit count that indicates available transmission time; and
   means for servicing channels that need to be serviced based on the available transmission time.

31. The communications system of claim 29, wherein the means for scheduling a first channel selection comprises:
   means for scheduling the first channel selection to provide the data from the selected channel at the data rate of the selected channel on the synchronous network.

32. The communications system of claim 29, wherein the means for scheduling a first channel selection comprises:
   means for timing a timed period; and
   means for periodically initiating the first channel selection from the first scan table based on the periodic expiration of the timed period.

33. A method for maintaining bandwidth in a communications system, comprising:
   scheduling a first channel selection comprising a plurality of channels from a first scan table maintained at a first stage of a network node;
   providing data from the channels of the first channel selection in a first packet;
   asynchronously transmitting the first packet and a second packet having information for each channel in the first channel selection;
   receiving the first packet and the second packet at a second stage of the network node;
   extracting the data from the first packet based on first information from the second packet;
   scheduling a second channel selection from a second scan table maintained at the second stage based on second information from the second packet; and
   providing the received data at a data rate of the selected channel on a synchronous network based on the second channel selection.

34. The method of claim 33, wherein scheduling a second channel selection comprises:
   timing a timed period; and
   initiating the second channel selection from the second scan table based on the periodic expiration of the timed period.

35. The method of claim 33, wherein scheduling a second channel selection comprises:
   maintaining a credit count that indicates available transmission time; and
   servicing channels that need to be serviced based on the available transmission time.

36. The method of claim 33, wherein scheduling a first channel selection comprises:
   scheduling the first channel selection to provide the data at the data rate of the selected channel on the synchronous network.

37. The method of claim 33, wherein scheduling a first channel selection comprises:
   timing a timed period; and
   initiating the first channel selection from the first scan table based on the periodic expiration of the timed period.

* * * * *